(12) United States Patent
Cui

(10) Patent No.: US 11,675,371 B2
(45) Date of Patent: Jun. 13, 2023

(54) SYSTEM AND METHOD FOR FLEET MANAGEMENT

(71) Applicant: Pony AI Inc., Grand Cayman (KY)

(72) Inventor: Piaoyang Cui, Santa Clara, CA (US)

(73) Assignee: Pony AI Inc., Grand Cayman (KY)

( * ) Notice: Subject to any disclaimer, the term of this patent is extended or adjusted under 35 U.S.C. 154(b) by 82 days.

(21) Appl. No.: 16/843,144

(22) Filed: Apr. 8, 2020

(65) Prior Publication Data

US 2021/0318695 A1 Oct. 14, 2021

(51) Int. Cl.
| | | |
|---|---|---|
| G05D 1/02 | (2020.01) | |
| G08G 1/00 | (2006.01) | |
| H04W 4/46 | (2018.01) | |
| B60W 30/16 | (2020.01) | |
| B60W 40/06 | (2012.01) | |
| G07C 5/00 | (2006.01) | |
| G08G 1/01 | (2006.01) | |

(52) U.S. Cl.
CPC ......... *G05D 1/0295* (2013.01); *B60W 30/162* (2013.01); *B60W 40/06* (2013.01); *G05D 1/0293* (2013.01); *G07C 5/008* (2013.01); *G08G 1/0112* (2013.01); *G08G 1/22* (2013.01); *H04W 4/46* (2018.02)

(58) Field of Classification Search
CPC .............. G05D 1/0295; G05D 1/0293; G05D 1/0287–0297; G05D 1/0289–0291; G05D 2201/0213; G05D 1/00–1/12; G07C 5/008; H04W 4/46; G08G 1/0112; G08G 1/22; G08G 1/20–207; G08G 1/096844; B60W 30/162; B60W 40/06; B60W 60/001; B60W 60/0017; B60W 60/00182; B60W 60/00186; B60W 30/18163; B60W 40/02–076; B60W 50/02; B60W 2050/048; G01S 17/931; G01C 21/00–21/3896
USPC .......................................................... 701/23
See application file for complete search history.

(56) References Cited

U.S. PATENT DOCUMENTS

| | | | |
|---|---|---|---|
| 8,743,148 B2 | 6/2014 | Gegner et al. | |
| 9,672,667 B2 | 6/2017 | Mason | |
| 9,747,793 B1 * | 8/2017 | Li | G08G 1/22 |
| 10,410,516 B1 * | 9/2019 | Andersson | G08G 1/052 |
| 11,113,960 B2 * | 9/2021 | Felip Leon | G05D 1/0088 |
| 2010/0256836 A1 * | 10/2010 | Mudalige | G08G 1/164 701/2 |
| 2010/0256852 A1 * | 10/2010 | Mudalige | G08G 1/22 701/24 |
| 2013/0066513 A1 * | 3/2013 | Schnelle | G06Q 10/06 701/29.3 |

(Continued)

*Primary Examiner* — Angelina Shudy
*Assistant Examiner* — Mohamed Abdo Algehaim

(57) ABSTRACT

Provided herein is a system and method for fleet coordination in a vehicle. The system comprises one or more sensors, one or more processors, and a memory storing instructions that, when executed by the one or more processors, cause the system to perform, capturing current data associated with the vehicle, planning a route of the vehicle based on the captured current data, navigating the vehicle in accordance with the planned route, detecting an instant position of the vehicle while navigating the vehicle, and coordinating a movement of another vehicle with the vehicle based on the detected instant position of the vehicle.

20 Claims, 15 Drawing Sheets

(56) References Cited

U.S. PATENT DOCUMENTS

| | | | |
|---|---|---|---|
| 2014/0107867 A1* | 4/2014 | Yamashiro | G08G 1/167 |
| | | | 701/2 |
| 2014/0316865 A1* | 10/2014 | Okamoto | G05D 1/0293 |
| | | | 705/14.1 |
| 2015/0154871 A1* | 6/2015 | Rothoff | B60W 30/00 |
| | | | 701/2 |
| 2015/0325062 A1* | 11/2015 | Mason | G07C 5/008 |
| | | | 701/29.3 |
| 2016/0232791 A1* | 8/2016 | Tosa | B60W 30/143 |
| 2017/0090473 A1* | 3/2017 | Cooper | H04W 4/38 |
| 2018/0018605 A1* | 1/2018 | Light-Holets | G06Q 10/06311 |
| 2018/0053409 A1* | 2/2018 | Li | H04W 4/40 |
| 2018/0129223 A1* | 5/2018 | High | G05D 1/0206 |
| 2018/0188746 A1* | 7/2018 | Lesher | G05D 1/0287 |
| 2018/0373268 A1* | 12/2018 | Antunes Marques Esteves | |
| | | | B60L 58/12 |
| 2019/0044728 A1* | 2/2019 | Karmoose | H04L 9/12 |
| 2019/0051158 A1* | 2/2019 | Felip Leon | G08G 1/096783 |
| 2019/0051159 A1* | 2/2019 | Wang | G05D 1/0088 |
| 2019/0220037 A1* | 7/2019 | Vladimerou | G05D 1/0088 |
| 2020/0027355 A1* | 1/2020 | Sujan | B60W 30/16 |
| 2020/0057453 A1* | 2/2020 | Laws | B60W 10/20 |
| 2020/0082727 A1* | 3/2020 | Zhao | G08G 1/096791 |
| 2020/0125086 A1* | 4/2020 | Switkes | B60T 7/22 |
| 2020/0153494 A1* | 5/2020 | Park | H04B 7/0617 |
| 2020/0183546 A1* | 6/2020 | Kim | B60K 37/06 |
| 2020/0294385 A1* | 9/2020 | Lowe | H04W 4/38 |
| 2020/0298882 A1* | 9/2020 | Kobayashi | B60W 30/16 |
| 2020/0342768 A1* | 10/2020 | Zhao | H04W 40/22 |
| 2021/0018323 A1* | 1/2021 | Freedman | G01C 21/3461 |
| 2021/0041893 A1* | 2/2021 | Matsumoto | G08G 1/22 |
| 2021/0065556 A1* | 3/2021 | Aijaz | G05D 1/0297 |
| 2021/0134159 A1* | 5/2021 | Cao | H04W 4/40 |
| 2021/0280057 A1* | 9/2021 | Ucar | G08G 1/20 |
| 2021/0407285 A1* | 12/2021 | Felip Leon | G08G 1/096783 |
| 2022/0292982 A1* | 9/2022 | Brandin | G08G 1/20 |

* cited by examiner

SYSTEM AND METHOD FOR FLEET MANAGEMENT

TECHNICAL FIELD

The present disclosure relates generally to fleet navigation, and particularly, to a vehicle managing a fleet.

BACKGROUND

Vehicles such as autonomous vehicles (AVs) or partially autonomous vehicles are capable of sensing a surrounding environment and performing navigation actions with little or no human input. However, a vehicle may only be able to perform and control actions on the vehicle itself, without having control over other vehicles or being controlled by other vehicles in a fleet. Thus, vehicles cannot be controlled to move in a coordinated fashion depending on movement of other vehicles, or direct movement of other vehicles in a coordinated manner. These shortfalls are addressed by the present disclosures, which provides a vehicle with capability to not only control navigation actions of the own vehicle, but also direct movement of other vehicles in a coordinated fashion and/or to move depending on movements of other vehicles in a coordinated fashion.

SUMMARY

Described herein are methods and systems of fleet management or coordination of a vehicle. A system that controls fleet management may be part of the vehicle itself or may be a central system, command center, control center, or processor, outside the vehicle. In some embodiments, some components that control fleet management may be integrated into the vehicle itself while other components may be part of a central controller.

Various embodiments of the present disclosure provide a vehicle system comprising one or more sensors configured to capture data, one or more processors, and a memory storing instructions that, when executed by the one or more processors, may cause the one or more processors to perform: capturing, using the one or more sensors, current data associated with the vehicle; planning a route of the vehicle based on the captured current data; navigating the vehicle in accordance with the planned route; detecting an instant position of the vehicle while navigating the vehicle; and coordinating a movement of another vehicle with the vehicle based on the detected instant position of the vehicle.

In some embodiments, the coordinating a movement of another vehicle comprises directing the another vehicle to maintain a same distance from the vehicle and maintain a same velocity as a velocity of the vehicle.

In some embodiments, the coordinating a movement of another vehicle comprises: determining a formation of a fleet comprising the vehicle and another vehicle; and commanding the another vehicle to maintain a position relative to the vehicle based on the determined formation of the fleet.

In some embodiments, the capturing the current data comprises capturing current data of a road condition, and wherein the coordinating a movement of another vehicle comprises: in response to detecting that the road condition prevents a continued deployment of the determined formation, controlling the fleet to adjust the formation to a new formation compatible with the road condition.

In some embodiments, the road condition comprises a distribution of traffic, a change in the distribution of traffic, or an accident.

In some embodiments, the instructions further cause the system to perform: determining whether the another vehicle becomes inoperational. In response to determining that the another vehicle becomes inoperational, the system further performs selecting a backup vehicle to replace the another vehicle and coordinating a movement of the backup vehicle with the vehicle based on the detected instant position of the vehicle.

In some embodiments, the instructions further cause the system to perform: determining, based on a road condition or a condition of the vehicle, whether the road condition or the condition of the vehicle prevents the vehicle from continuing to coordinate the movement of the another vehicle; and in response to determining that the road condition or the condition of the vehicle prevents the vehicle from continuing to coordinate the movement of the another vehicle, navigating the vehicle based on a signal or command from a third vehicle that coordinates another fleet of vehicles.

In some embodiments, the instructions further cause the system to perform: determining, based on a road condition or a condition of the vehicle, whether the road condition or the condition of the vehicle prevents the vehicle from continuing to coordinate the movement of the another vehicle; and in response to determining that the road condition or the condition of the vehicle prevents the vehicle from continuing to coordinate the movement of the another vehicle, navigating the vehicle based on a signal or command from the another vehicle, the another vehicle coordinating the movement of the vehicle.

In some embodiments, the coordinating a movement of another vehicle comprises commanding the another vehicle to conform to a formation of a fleet; and the instructions further cause the system to perform: detecting a signal from a third vehicle that the third vehicle intends to join the fleet; determining whether to permit the third vehicle to join the fleet based on a road or traffic condition; and in response to determining to permit the third vehicle to join the fleet, changing the formation to a new formation to accommodate the third vehicle.

In some embodiments, the changing the formation to a new formation comprises maintaining a distance between the vehicle and the another vehicle in the new formation to be equal to a distance between the vehicle and the another vehicle in the formation.

Various embodiments of the present disclosure provide a method implemented by a computing system including one or more processors and storage media storing machine-readable instructions, wherein the method is performed using the one or more processors. The method may comprise, capturing, using one or more sensors, current data associated with the vehicle; planning a route of the vehicle based on the captured current data; navigating the vehicle in accordance with the planned route; detecting an instant position of the vehicle while navigating the vehicle; and coordinating a movement of another vehicle with the vehicle based on the detected instant position of the vehicle.

In some embodiments, the coordinating a movement of another vehicle comprises directing the another vehicle to maintain a same distance from the vehicle and maintain a same velocity as a velocity of the vehicle.

In some embodiments, the coordinating a movement of another vehicle comprises: determining a formation of a fleet comprising the vehicle and another vehicle; and commanding the another vehicle to maintain a position relative to the vehicle based on the determined formation of the fleet.

In some embodiments, the capturing the current data comprises capturing current data of a road condition, and wherein the coordinating a movement of another vehicle comprises: in response to detecting that the road condition prevents a continued deployment of the determined formation, controlling the fleet to adjust the formation to a new formation compatible with the road condition.

In some embodiments, the road condition comprises a distribution of traffic, a change in the distribution of traffic, or an accident.

In some embodiments, the method further comprises determining whether the another vehicle becomes inoperational. The method comprises, in response to determining that the another vehicle becomes inoperational: selecting a backup vehicle to replace the another vehicle; and coordinating a movement of the backup vehicle with the vehicle based on the detected instant position of the vehicle.

In some embodiments, the method further comprises determining, based on a road condition or a condition of the vehicle, whether the road condition or the condition of the vehicle prevents the vehicle from continuing to coordinate the movement of the another vehicle; and in response to determining that the road condition or the condition of the vehicle prevents the vehicle from continuing to coordinate the movement of the another vehicle, navigating the vehicle based on a signal or command from a third vehicle that coordinates another fleet of vehicles.

In some embodiments, the method further comprises determining, based on a road condition or a condition of the vehicle, whether the road condition or the condition of the vehicle prevents the vehicle from continuing to coordinate the movement of the another vehicle; and in response to determining that the road condition or the condition of the vehicle prevents the vehicle from continuing to coordinate the movement of the another vehicle, navigating the vehicle based on a signal or command from the another vehicle, the another vehicle coordinating the movement of the vehicle.

In some embodiments, the coordinating a movement of another vehicle comprises commanding the another vehicle to conform to a formation of a fleet. The method further comprises: detecting a signal from a third vehicle that the third vehicle intends to join the fleet; determining whether to permit the third vehicle to join the fleet based on a road or traffic condition; and in response to determining to permit the third vehicle to join the fleet, changing the formation to a new formation to accommodate the third vehicle.

In some embodiments, the changing the formation to a new formation comprises maintaining a distance between the vehicle and the another vehicle in the new formation to be equal to a distance between the vehicle and the another vehicle in the formation.

Various embodiments of the present disclosure provide a vehicle system comprising one or more sensors configured to capture data, one or more processors, and a memory storing instructions that, when executed by the one or more processors, may cause the one or more processors to perform, planning a route for a vehicle, detecting a location of the vehicle during the route, determining a navigation action in response to the detected location of the vehicle, and communicating with at least one following vehicle based on the determined navigation action.

In some embodiments, the instructions may further cause the system to perform, detecting, using the one or more sensors, a road condition, and switching between a leading mode and an independent mode based on the detected road condition. In some embodiments, the road condition may comprise a level or distribution of traffic, a number, density, or location of car accidents, a bump, a pothole, a weather condition or change in weather condition.

In some embodiments, the instructions may further cause the system to perform, determining whether the leading mode is operational or feasible, and in response to the determining that the leading mode is inoperational or infeasible, determining whether a following mode is operational. The system may also perform, in response to the determining that the following mode is inoperational or infeasible, switching to the independent mode, and in response to the determining that the following mode is operational or feasible, switching to the following mode. In some embodiments, the determining the navigation action may comprise determining the navigation action based on a relative distance or position of the at least one following vehicle.

In some embodiments, the communicating with at least one following vehicle may comprise sending an instruction to the at least one following vehicle to be positioned within a range of distances from the vehicle and maintain a velocity within a velocity range.

In some embodiments, the instructions may cause the system to perform, determining whether the at least one following vehicle is positioned within a range of distances from the vehicle, and in response to determining that the at least one following vehicle is not positioned within a range of distances from the vehicle, adjusting a velocity of the vehicle to position the vehicle within a range of distances from the following vehicle.

In some embodiments, the instructions may further cause the system to perform detecting, using the one or more sensors, a road condition, adjusting a velocity, a direction, or the planned route of the vehicle to a backup route in response to detecting a road condition, and notifying the at least one following vehicle of the road condition, and the adjusted velocity, direction, or backup route of the vehicle.

In some embodiments, the planning the route may comprise selecting a route based on a predicted traffic or predicted weather condition.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
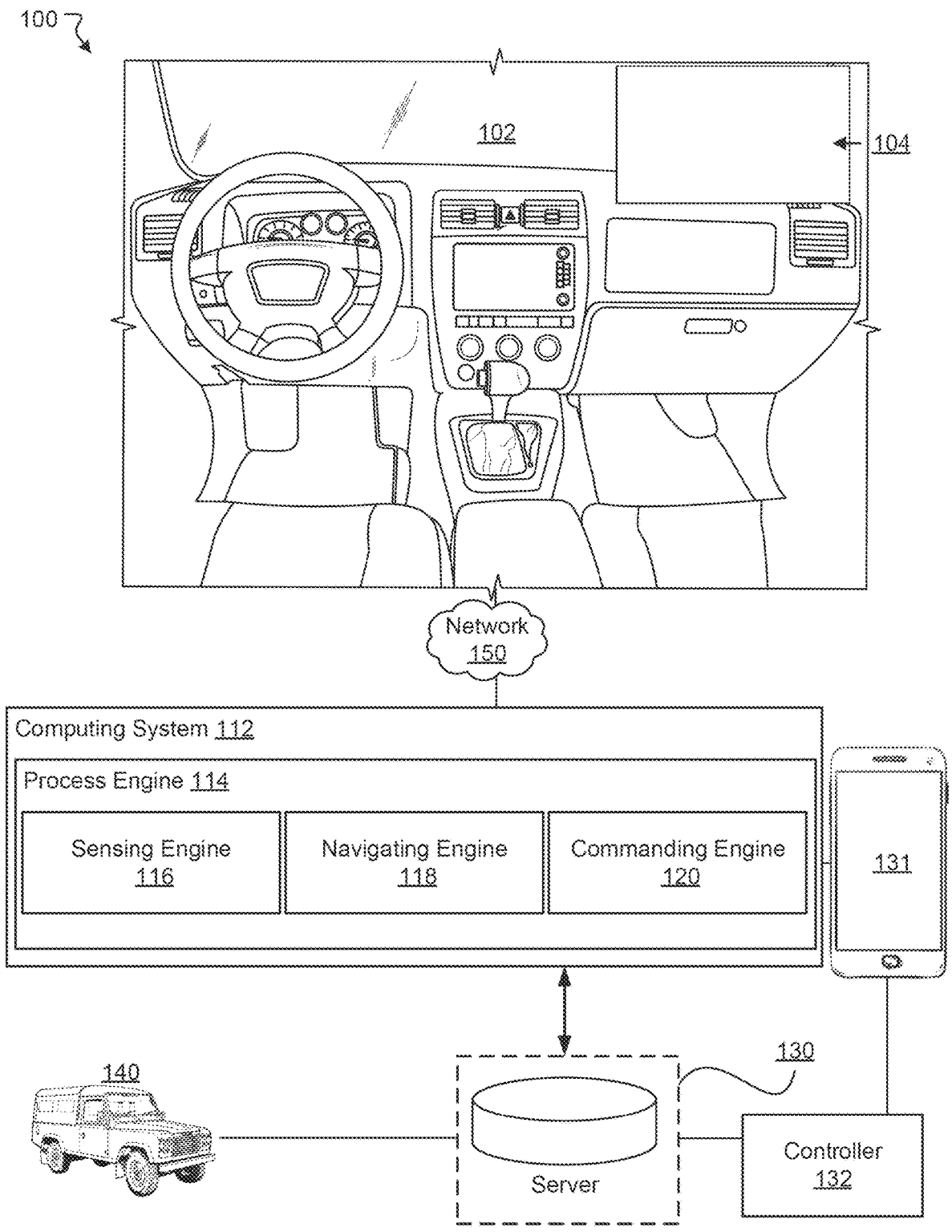
FIG. 1 illustrates an example environment of a system that manages or coordinates a fleet of vehicles.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Systems and methods are provided to manage and coordinate, using a leading vehicle or an external controller, a fleet of vehicles, for example, based on a location, movement, velocity, and/or acceleration of a leading vehicle of a fleet. The leading vehicle of the fleet may direct or coordinate actions such as navigation actions of other vehicles either by direct commands to the other vehicles and/or by sending commands or information to an external controller that directs commands of all vehicles including the leading vehicle and the other vehicles. The fleet may comprise vehicles distributed at specified locations in an industrial or commercial area to provide transportation, deliveries, or other services. The vehicles in the fleet may be utilized in a tram mode, elevator mode, or taxi mode. The leading vehicle and/or the controller may communicate with at least one other vehicle. The leading vehicle and/or the controller may also determine positions of the other vehicles. The leading vehicle and/or the controller may control or adjust the relative locations of the other vehicles compared to the leading vehicle, for example, by maintaining a constant distance between the leading vehicle and the other vehicles.

In some embodiments, the leading vehicle may manage the fleet operation or navigation in response to certain road conditions. In some embodiments, the leading vehicle may detect a road condition, and switch modes between a leading mode, a following mode, or an independent mode. In some examples, when the leading vehicle or the external controller determines that the leading mode in the leading vehicle is not operational, which may result from a broken sensor, equipment, or an incompatible road condition, the leading vehicle may switch from the leading mode to the following mode. As another example, if the previously designated leading vehicle or a following vehicle, or the external controller, determines that the following mode is also inoperational, for example, as a result of no operational leading vehicle being present, or a road condition not allowing fleet operation, that vehicle may itself switch to the independent mode, in which that vehicle is not controlled by, nor directs actions of, a fleet.

In some implementations, the leading vehicle, a following vehicle, or the external controller may determine whether at least one following vehicle is inoperational, which may result from a broken sensor, equipment, a breakdown of the vehicle, or an incompatible road condition. Upon such determination, the leading vehicle or the external controller may remove the at least one following vehicle from the fleet. When the at least one following vehicle is determined not to be a part of the fleet operation or the fleet navigation, the at least one following vehicle may switch to the independent mode and/or may select a backup vehicle to replace the inoperational following vehicle such that the leading vehicle or the external controller may ensure the maintenance of the original fleet formation, operation, and/or navigation.

FIG. 1 illustrates an example environment 100 of a system that manages or coordinates a fleet of vehicles. The fleet may be used for celebration, for delivery of supplies or transportation, or for a motorcade for a special event such as an inauguration. In various embodiments, at least one computing system 112 that includes one or more processors and memory, may be connected, over a network 150, to a device 131. The at least one computing system 112 may be physically and/or electrically connected to a vehicle 102. In some embodiments, the vehicle 102 may be a leading vehicle of a fleet; for example, the vehicle 102 may direct or command other vehicles part of the fleet by directly issuing commands or by providing information and/or commands to an external controller, which issues commands to the other vehicles. In some embodiments, the at least one computing system 112 may be integrated as part of the vehicle 102. In various embodiments, the vehicle 102 may include sensors such as laser scanning systems (e.g., Lidar systems), radar systems, cameras, GPS, sonar, ultrasonic, IMU, and FIR (far infrared) sensors and/or the like, to obtain data and to determine one or more driving or navigation actions. One or more users may, through the device 131, request, view, and/or access details of a map, entities or objects on the map, and/or parameters of the entities or the map such as the predicted amount of change of one or more entities. Inside the vehicle 102 may be a satellite map or a high definition (HD) map 104 that shows surroundings on a road in a vicinity of the vehicle 102.

The processors may be configured to perform various operations by interpreting machine-readable instructions. In some embodiments, the example environment 100 may be implemented as a data platform. In some embodiments, the example environment 100 may be configured to interact with at least one computing system 112 of the data platform. In various embodiments, the at least one computing system 112 of the data platform may coordinate and/or control one or more operations of sensing, using one or more sensors, current data of one or more locations within the vehicle 102; determining one or more navigation actions of the vehicle 102; and updating the historical data of the identified one or more locations based on the determined one or more changes.

In some embodiments, the computing system 112 may include a process engine 114. The process engine 114 may include a sensing engine 116, a navigating engine 118, and a commanding engine 120. The process engine 114 may be executed by the processor(s) of the computing system 112 to perform various operations including those operations described in reference to the sensing engine 116, the navigating engine 118, and the commanding engine 120. In general, the process engine 114 may be implemented, in whole or in part, as software that is capable of running on one or more computing devices or systems. In one example, the process engine 114 may be implemented as or within a software application running on one or more computing devices (e.g., user or client devices) and/or one or more servers (e.g., network servers or cloud servers, servers 130). In some instances, various aspects of the sensing engine 116, the navigating engine 118, and the commanding engine 120 may be implemented in one or more computing systems and/or devices. In some instances, one or more of the sensing engine 116, the navigating engine 118, and the commanding engine 120 may be combined or integrated into a single processor, and some or all functions performed by one or more of the sensing engine 116, the navigating engine 118, and the commanding engine 120 may not be spatially separated, but instead may be performed by a common processor. The environment 100 may also include the one or more servers 130 accessible to the computing system 112. The one or more servers 130 may store and update information of sensor data acquired by the sensing engine 116, absolute and relative positions, velocities, accelerations, and operational parameters such as fuel economy, energy consumption, RPMs (revolutions per minute) of the vehicle 102, and of other vehicles of the fleet.

In some embodiments, the one or more servers 130 may integrate data from different sensors. In other embodiments, the one or more servers 130 may keep the data from the different sensors separate. The one or more servers 130 may be accessible to the computing system 112 either directly or over the network 150. In some embodiments, the one or more servers 130 may store data that may be accessed by the process engine 114 to provide the various features described herein. In some instances, the one or more servers 130 may include federated data stores, databases, or any other type of data source from which data may be stored and retrieved, for example. In some implementations, the one or more servers 130 may include various types of data sets on which determinations of accuracy or consistency with other information can be made. In general, a user operating a computing device can interact with the computing system 112 over the network 150, for example, through one or more graphical user interfaces and/or application programming interfaces. The computing system 112 may interact with a controller 132 which may be external to the vehicle 102. The controller 132 may acquire data from the vehicle 102 of the vehicle 102 itself, for example, from the computing system 112, or data of other vehicles, and manage or direct operations of other vehicles in the fleet such as other following vehicles in the fleet. The one or more servers 130 may store data from the vehicle 102 and data from another vehicle 140. The one or more servers 130 may store data from the another vehicle 140 and exchange the data from the another vehicle 140 with the vehicle 102. The one or more servers 130 may exchange data from the one or more servers 130 with the vehicle 102 or the another vehicle 140. The one or more servers 130 may further organize the data in one or more lookup tables.

The sensing engine 116 may be configured to control operations of or relating to the sensors such as LiDAR sensors, radar systems and cameras, and processing data acquired by the sensors, to sense current data of one or more locations surrounding or in a vicinity of the vehicle 102. The sensing engine 116 may further be configured to detect or determine absolute and relative positions, velocities, accelerations of the vehicle 102 and/or of other vehicles. In some embodiments, the sensing engine 116 may determine one or more conditions surrounding the vehicle 102. The condition may be a level or distribution of traffic, a number, density, or location of car accidents, a bump, a pothole, a weather condition, or change in weather condition. The sensing engine 116 may detect at least one following vehicle and movements, velocities, and accelerations of the at least one following vehicle surrounding the vehicle 102. The following vehicle may be a vehicle that follows a leading vehicle and is part of a fleet.

The sensing engine 116 may function to process captured sensor data. In some embodiments, the sensing engine 116 may process sensor data captured at different times or from different sensor modalities to make the data compatible or suitable for comparison. In some embodiments, the sensor data processing system 110 may analyze sensor data to identify objects and vehicles surrounding the vehicle 102.

In some embodiments, the sensing engine 116 may filter the captured sensor data. In other embodiments, the sensing engine 116 may not include filtering functionality. In other embodiments, the filtering functionality is provided separately (not shown).

In some embodiments, the commanding engine 118 may provide commands to other vehicles in the fleet, for example, to follow a planned route or to change routes due to changes in a planned route of the vehicle 102 or of other vehicles, or due to changes in road conditions such as detours or road closures, or weather conditions. The commanding engine 118 may command or direct the other vehicles to remain at a position behind the vehicle 102, or to be deployed or positioned at other locations relative to the vehicle 102. The commanding engine 118 may command or direct the other vehicles to remain at a same relative position with respect to one another and to the vehicle 102, with a same relative distance among each of the other vehicles and the vehicle 102, or to change relative distances among the other vehicles and the vehicle 102. As an example, the commanding engine 118 may command one of the other vehicles to more farther away from or closer to another vehicle in the fleet. The commanding engine 118 may provide commands to the other vehicles to change a speed, direction, and/or acceleration, or for one of the other vehicles to leave the fleet, or provide a command to another vehicle to enter the fleet. The commanding engine 118 may send information and/or commands to the controller 132, so that the controller 132 may provide commands to the other vehicles in the fleet.

In some embodiments, the navigating engine 120 may control navigation actions of the vehicle 102. The navigating engine 120 may plan a route of the vehicle 102. The planned route may be based on a predicted traffic and/or based on a predicted weather condition. The navigating engine 120 may further adjust the navigation actions to follow a planned route or to change routes due to changes in a planned route of the vehicle 102 or of other vehicles, or due to changes in road conditions such as detours or road closures, traffic distribution or density, a number or location of car accidents, a bump, pothole, or other obstacle, weather conditions or a change in weather conditions.

In some embodiments, the controller 132 and/or the leading vehicle, such as the vehicle 102, may determine a formation of the fleet and a route for the leading vehicle of the fleet. The controller 132 may continuously detect locations, velocities and accelerations of the leading vehicle 102 during the route, and determine fleet operations and management based on the detected location, velocity, and acceleration of the vehicle 102. In response to unforeseen or unexpected road conditions or other conditions that cause the route of the leading vehicle to deviate from the route determined by the controller 132 by more than a threshold amount, the controller 132 may adjust routes of the other vehicles, such as the following vehicles, to maintain the formation of the fleet. In some embodiments, the controller 132 may communicate with the other vehicles regarding adjusted routes.

In some embodiments, the controller 132 and/or the leading vehicle may be configured to switch the vehicle 102 among the leading mode, the following mode, and the independent mode. In some examples, the switching may be based on, or a result of, a road condition or a condition of the vehicle 102, or of other vehicles, or a change in the road condition or the condition of the vehicle 102, or a change in the other vehicles. The controller 132 and/or the leading vehicle may determine whether the leading mode in the leading vehicle is operational. If the controller 132 and/or the leading vehicle determines that the leading mode is not operational, the controller 132 and/or the leading vehicle may be configured to switch the leading vehicle to the following mode or the independent mode.

In some embodiments, the controller 132 and/or the leading vehicle may also be configured to determine whether the other vehicles such as the following vehicles are operational. When a following vehicle is determined not to be operational, for example, if the following vehicle breaks down, the controller 132 and/or the leading vehicle may rearrange and adjust a relative position of the following vehicle with respect to the other vehicles. The controller 132 and/or the leading vehicle may select a backup following vehicle to replace the inoperational following vehicle, such that the backup following vehicle may be positioned within a range of distances from the leading vehicle or that the backup following vehicle will be positioned at a same position that the previous following vehicle would have been.

The network 150 may represent one or more computer networks (e.g., LAN, WAN, bus, or the like) or other transmission mediums. The network 150 may provide communication between the vehicle 102, the controller 132, the server 130, and the other vehicles 140. In some embodiments, the network 150 may include one or more computing devices, routers, cables, buses, and/or other network topologies (e.g., mesh, and the like). In some embodiments, the network 150 may be wired and/or wireless. In various embodiments, the network 150 may include the Internet, one or more wide area networks (WANs) or local area networks (LANs), one or more networks that may be public, private, IP-based, non-IP based, and so forth.

Figure 2A:
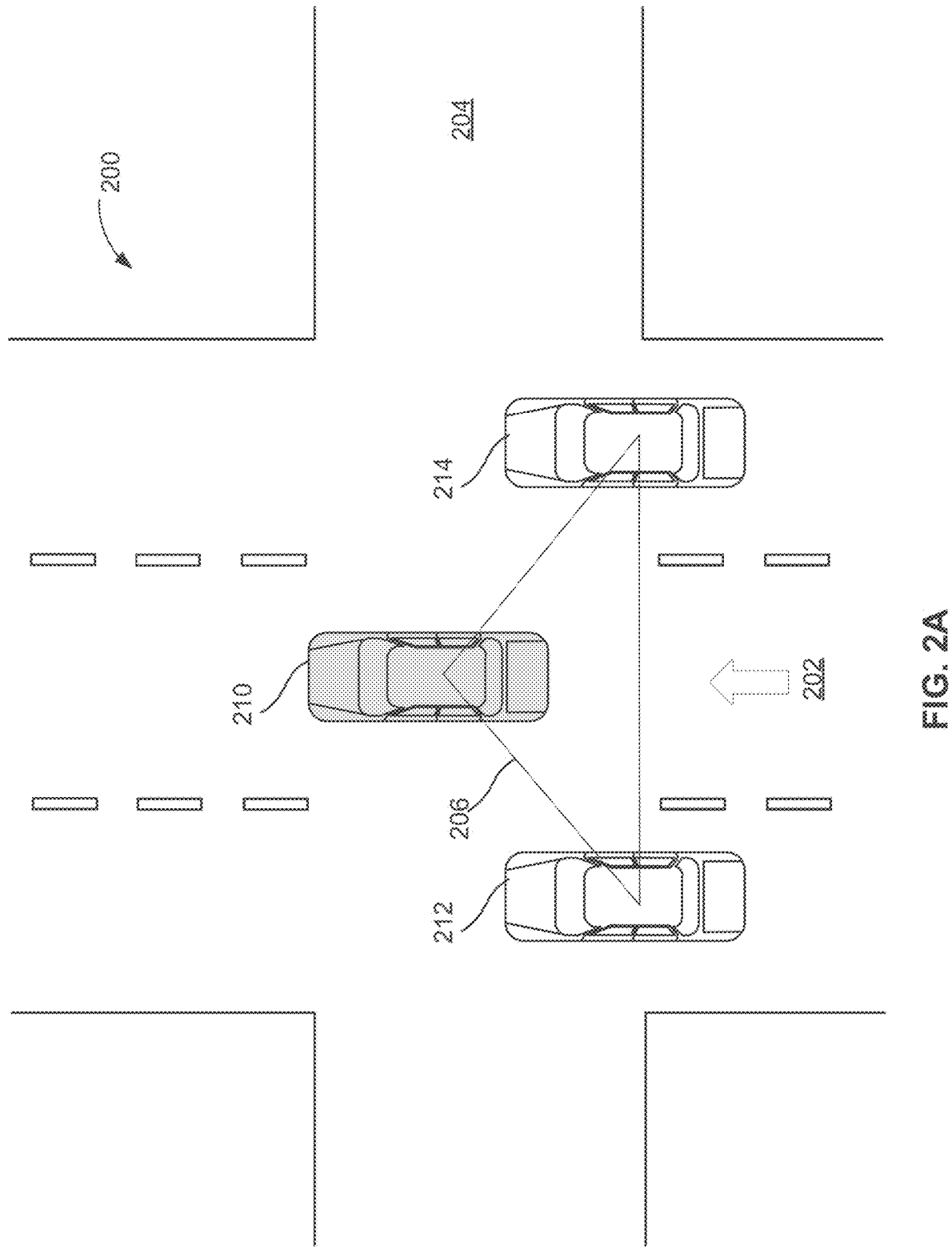
FIG. 2A, FIG. 2B, FIG. 2C, FIG. 3A, FIG. 3B, FIG. 3C, FIG. 4A, FIG. 4B, and FIG. 4C illustrate example implementations of a computing system of a vehicle that manages or coordinates a fleet of vehicles.
Figure 2B:
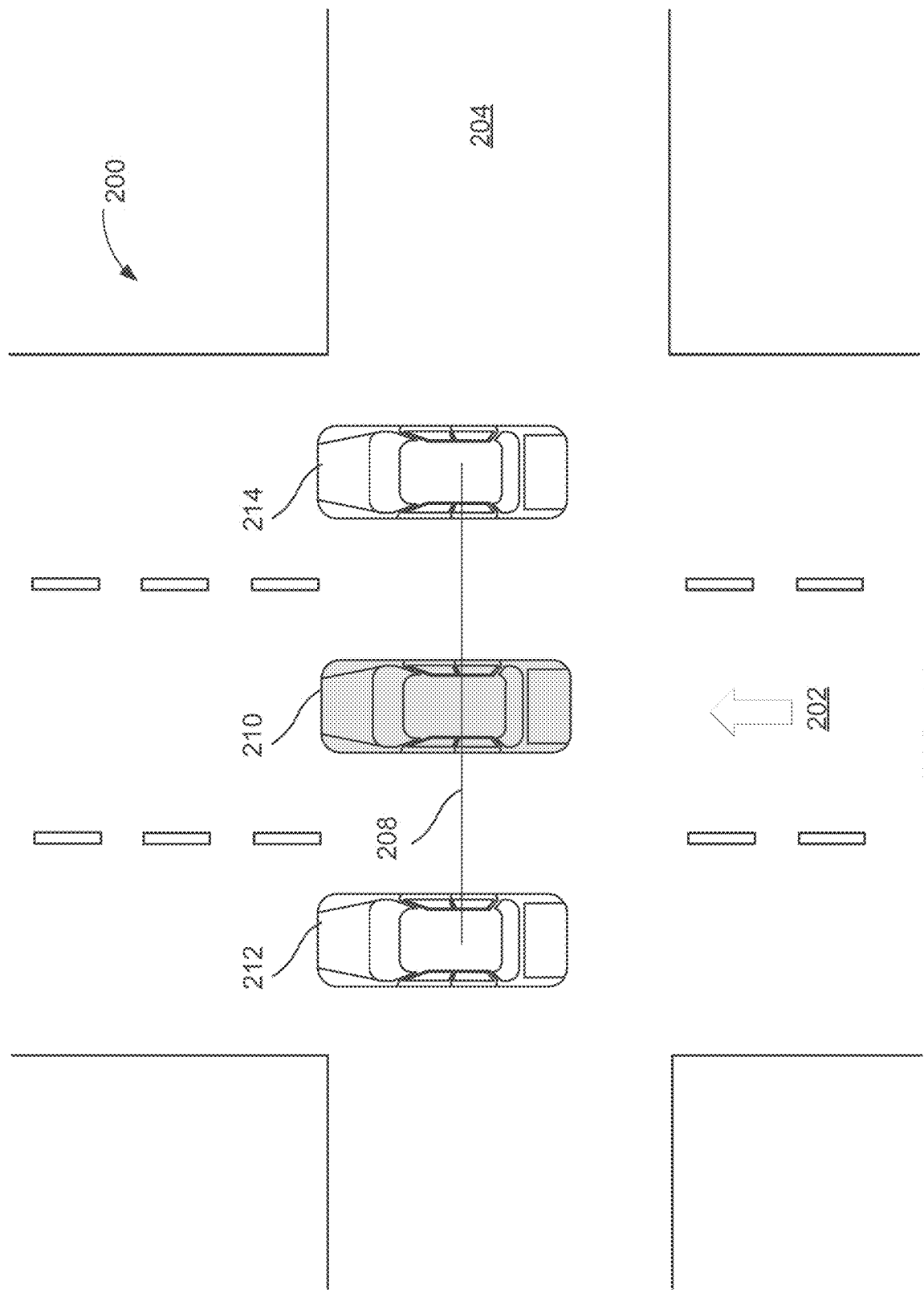
Figure 2C:
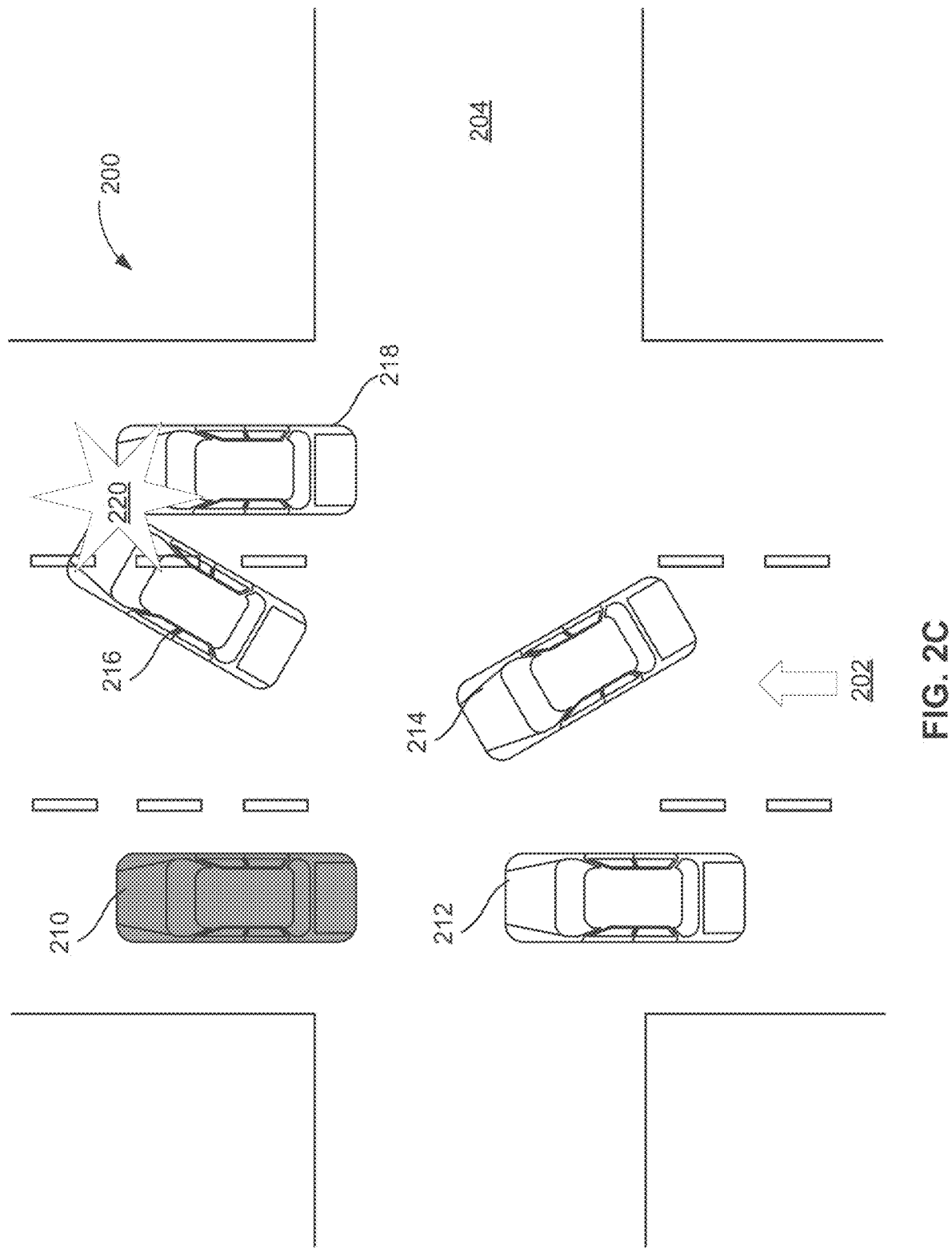

FIG. 2A, FIG. 2B, and FIG. 2C illustrate an example implementation 200 of a computing system such as the computing system 112 of vehicle 210, which may be implemented as the vehicle 102 of FIG. 1, in accordance with some embodiments. In FIG. 2A, FIG. 2B, and FIG. 2C, any reference to a vehicle performing a determination or taking an action may be understood to mean that one or more processors of the vehicle or the controller 132 may perform the determination or take the action. The particular details and aspects of FIG. 1 may be applicable to FIG. 2A, FIG. 2B, and FIG. 2C. In FIG. 2A, the vehicle 210 may be a leading vehicle. The vehicle 210 may be navigating on a road 202 orthogonal to a road 204 that intersects the road 202. The road 202 may be one-way road and include three lanes. The vehicle 210 may be driving on the middle lane of the road 202. Two following vehicles 212, 214 may be driving on a left lane and a right lane of the road 202 respectively. The leading vehicle 210 and the following vehicles 212 and 214 may together form a fleet having a triangular formation 206. The computing system 112 of the vehicle 210 may command or direct both the following vehicles 212 and 214 to remain at a specific distance away from, and at a specific position with respect to, the vehicle 210. The computing system 112 of the vehicle 210 may command or direct both the following vehicles 212 and 214 to maintain a same velocity as the velocity of the vehicle 210. In some embodiments, the computing system 112 may provide data or instructions to the controller 132. The controller 132 may, in turn, provide commands or instructions to the following vehicles. In some embodiments, as shown in FIG. 2B, the computing system 112 of the vehicle 210, or the controller 132, may direct or instruct the following vehicles 212 and 214 to change positions with respect to the vehicle 210 in order to reconfigure the previous formation 206 into a new formation 208 such that the vehicle 210 and the following vehicles 212 and 214 are side-by-side with the vehicle 210. In some embodiments, the computing system 112 of the vehicle 210, or the controller 132, may be configured to send instructions to the following vehicles 212 and 214 to momentarily speed up to become aligned side-by-side with the vehicle 210, and once aligned side-by-side, to maintain a same velocity and acceleration as the vehicle 210.

In FIG. 2C, the vehicle 210 may switch to an independent mode in response to a road condition being detected, for example, by one or more processors such as one or more processors in the sensing engine 116 of the vehicle 210. The computing system 112 of the vehicle 210 or the controller 132 may switch the vehicle 210 to an independent mode, in some embodiments, when an accident or traffic congestion is detected. In FIG. 2C, an accident 220 may have occurred and been detected between independent vehicles 216 and 218 which are not part of the fleet. The accident 220 may further cause a middle lane and/or a right lane to be blocked, thus rendering a previous formation such as the formations 206 or 208 impossible and preventing a continued deployment of the previous formation. In some embodiments, the vehicle 210 may control the fleet containing the other vehicles 212 and 214 to adjust to a new formation that is compatible with the accident 220 and would not be prevented by the accident 220. In some embodiments, the computing system 112 of the vehicle 210 or the controller 132 may determine that maintaining the fleet in either of the formations 206 or 208 would be unsafe due to a traffic density being higher than a threshold, or due to a distribution of traffic.

The computing system 112 of the vehicle 210 or the controller 132 may switch the vehicle 210 from a leading mode, as shown in FIG. 2A or FIG. 2B, to an independent mode, as shown in FIG. 2C, in which the vehicle 210 is no longer part of, and/or is no longer managing or coordinating the fleet. In some embodiments, in response to a change in a distribution of traffic, a number or an existence of vehicular or other accidents, a bump, pothole, other obstacle, weather condition, or change in weather condition, the computing system 112 of the vehicle 210 or the controller 132 may determine to disband the fleet and to switch the vehicle 210 to the independent mode. In some embodiments, in response to a vehicular accident or other accident blocking a lane that the vehicle 210 is travelling on, the vehicle 210 may switch from the leading mode to a following mode, and thus direct another vehicle, such as a previously following vehicle on a lane unaffected by the accident, to become a leading vehicle. Thus, the vehicle 210 may, in response to determining that the road condition or the condition of the vehicle prevents the vehicle from continuing to coordinate the movement of the another vehicle, navigate the vehicle based on a signal or command from the another vehicle, so that the previous leading vehicle and a previous following vehicle switch roles with each other.

When the vehicle 210 detects an accident 220 surrounding the vehicle 210 and the following vehicles 212, 214, the vehicle 210 may determine whether to switch to a following mode or an independent mode to prevent the vehicle 210 and the following vehicles 212 and 214 from colliding with the accident 220. In some embodiments, the computing system 112 of the vehicle 210 or the controller 132 may switch a route to a backup route and/or switch a formation of the vehicle 210 and the following vehicles 212 and 214 to a backup formation. For example, the vehicle 210 may change its route to switch to an unoccupied left lane of the road 202. In some examples, the following vehicles 212 and 214 may be directed or commanded to keep a same formation as the previous formation 206 or 208, or change a formation.

Figure 3A:
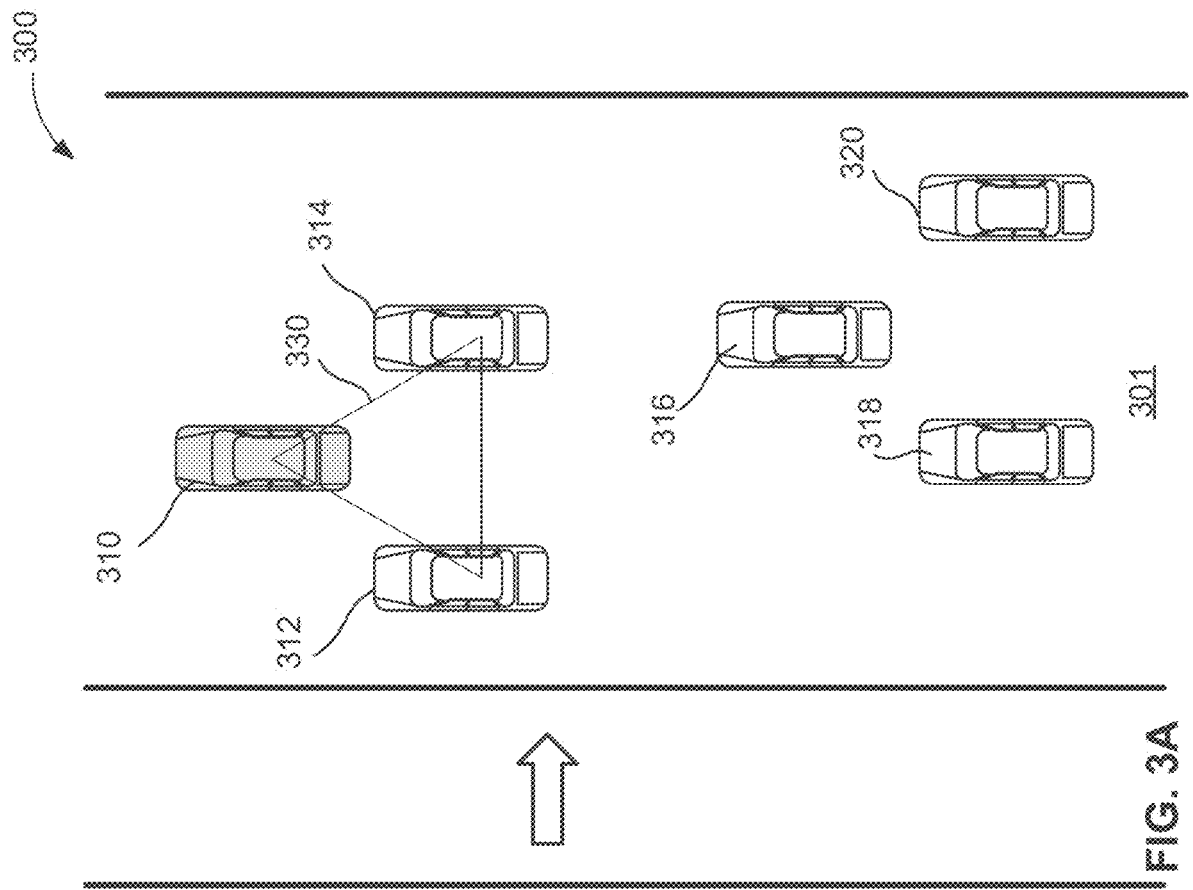
Figure 3A:
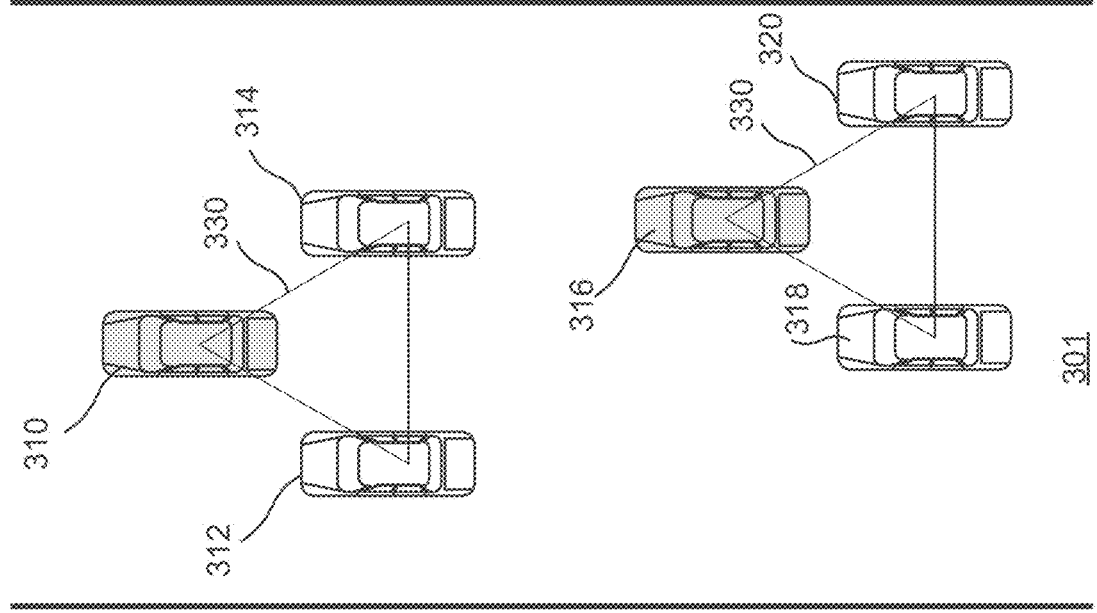
Figure 3B:
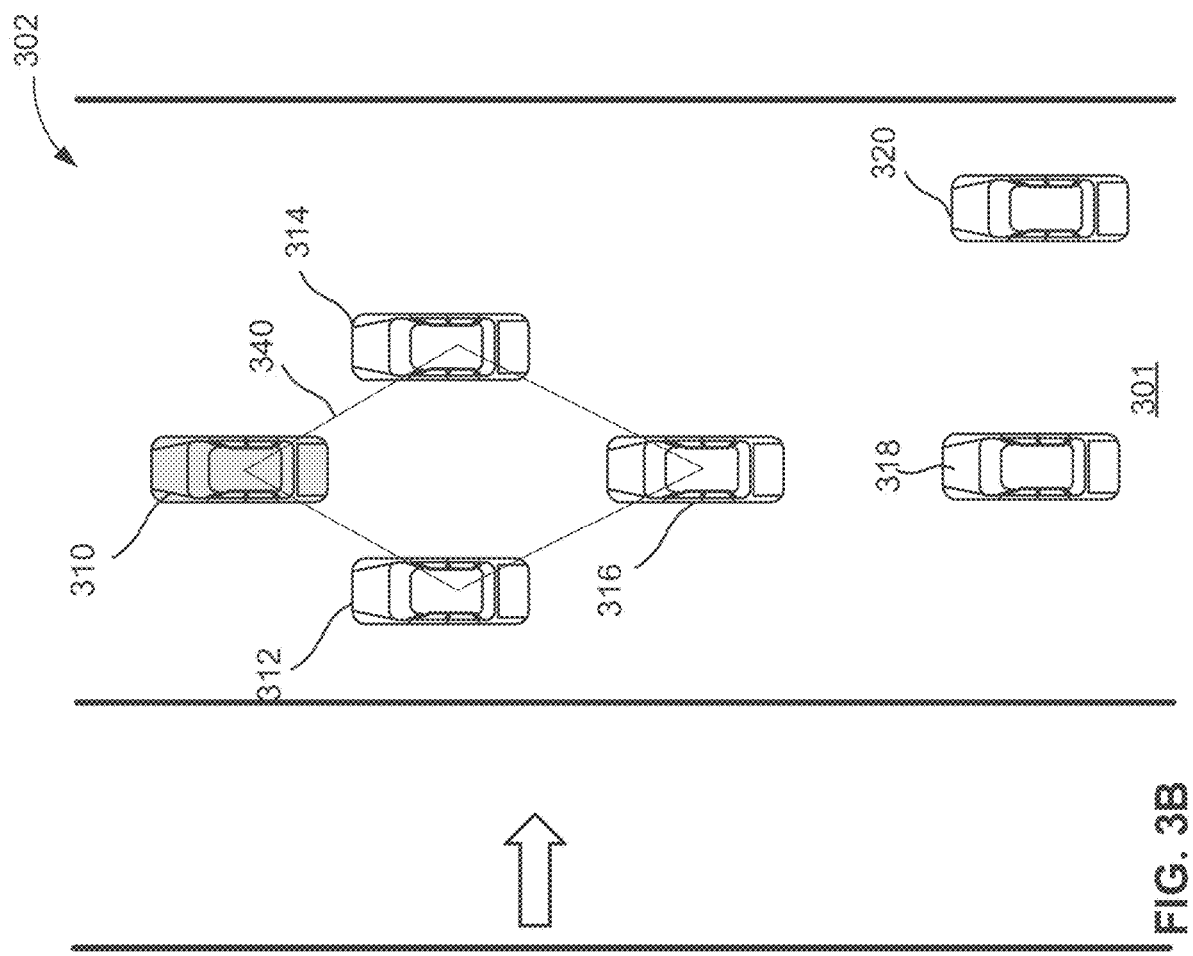
Figure 3B:
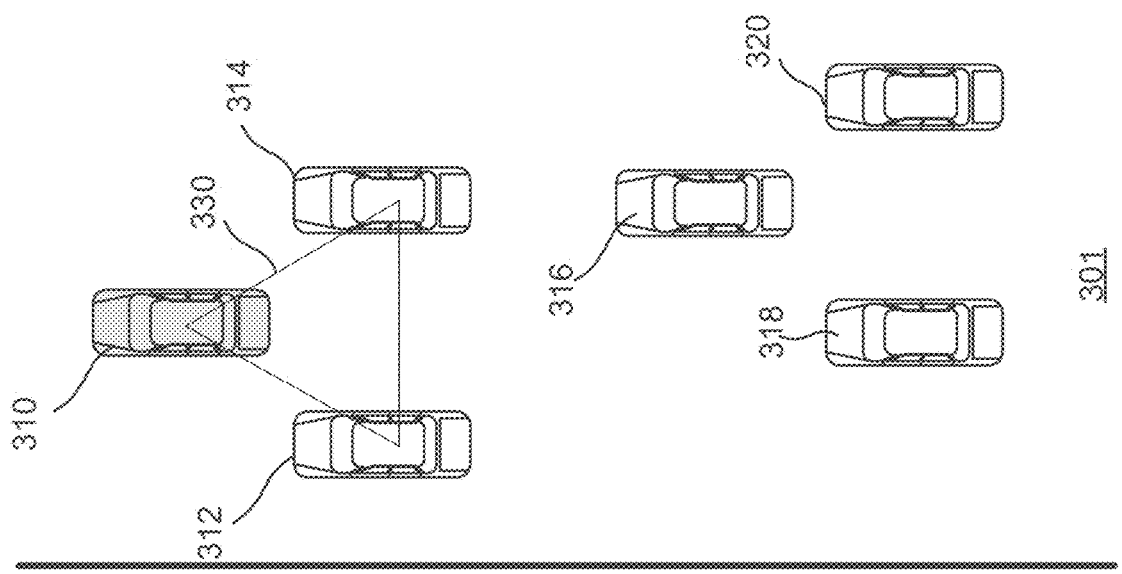
Figure 3C:
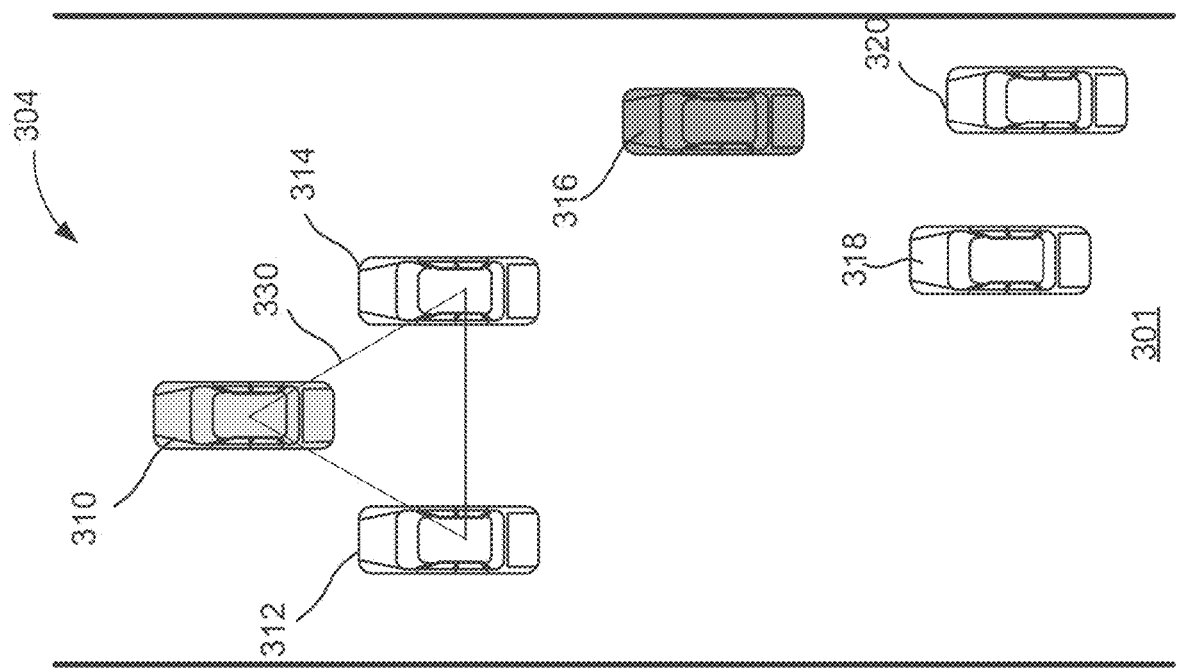
Figure 3C:
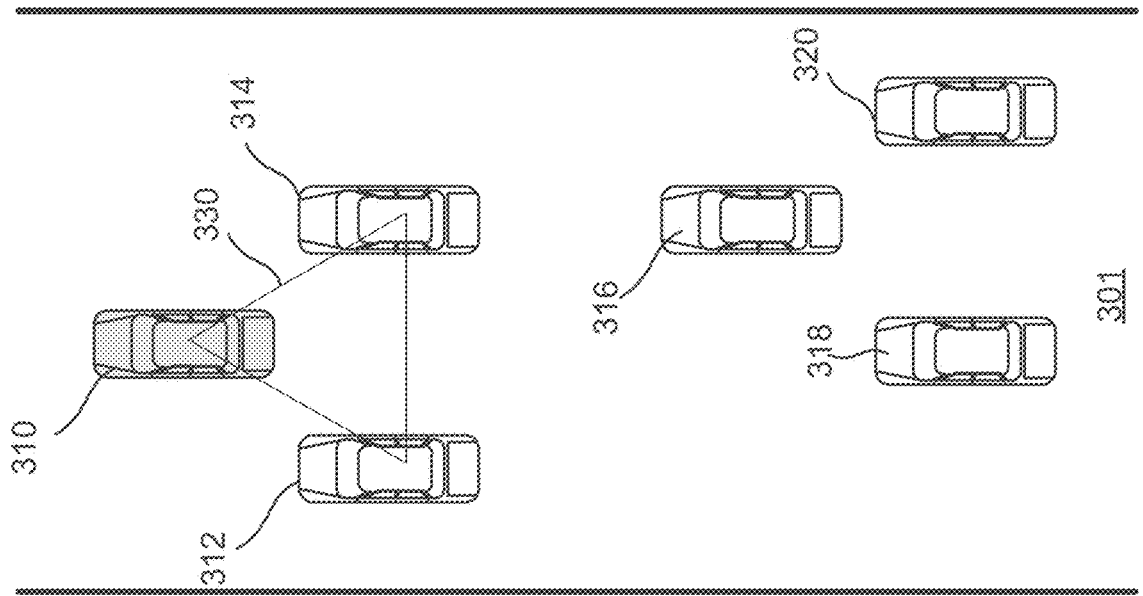

FIG. 3A, FIG. 3B, and FIG. 3C illustrate an example implementation 300 of a computing system such as the computing system 112 of vehicle 310 or vehicle 316, each of which may be implemented as the vehicle 102 of FIG. 1, in accordance with some embodiments. The particular details and aspects of FIG. 1 may be applicable to FIG. 3A, FIG. 3B, and FIG. 3C. In FIG. 3A, FIG. 3B, and FIG. 3C, any reference to a vehicle performing a determination or taking an action may be understood to mean that one or more processors of the vehicle or the controller 132 may perform the determination or take the action. The vehicles 310 and 316 may be driving on a road 301 and may be leading vehicles. Other vehicles 312, 314, 318, and 320 may also be driving on the road 301 as following vehicles that take commands or direction from one of the vehicles 310 or 316, or from the controller 132. The vehicle 310 or the controller 132 may direct or command the vehicles 312 and 314 to conform to a formation 330. Similarly, the vehicle 316 or the controller 132 may direct or command the vehicles 318 and 320 to conform to the formation 330. In some embodiments, the vehicle 316 or the controller 132 may switch the vehicle 316 off from the leading mode, in which the vehicles 318 and 320 do not take commands or directions from the vehicle 316 pertaining to the fleet. The vehicle 316 may switch to a following mode and instead take commands or directions from another vehicle, such as the vehicle 310. In some embodiments, the vehicles 318 and 320 may instead take commands or directions from another vehicle, such as a nearest leading vehicle, or the vehicle 310. In some embodiments, the vehicle 316 may signal to the vehicle 310 that the vehicle 316 intends to join the fleet having the vehicle 310 as the leading vehicle. In response to the vehicle 310 detecting that the vehicle 316 intends to join the fleet, the vehicle 310 may further detect other vehicles previously under a command of the vehicle 316. The vehicle 310 may further determine whether road or traffic conditions permit one or more other vehicles to join the fleet. The vehicle 310 may reconfigure or change the formation 330 to a new formation 340 that accommodates and includes at least one of additional vehicles 316, 318, and 320. The vehicle 310 may send instructions or commands to the vehicles 312, 314, 316 to be positioned at particular locations and orientations relative to the vehicle 310 to conform to the new formation 340. In some examples, the vehicle 310 may determine a new formation 340 based on a number and/or type of remaining vehicles in the formation and a road condition or configuration. For example, the new formation 340 may have the vehicles 310 and 312 having a same distance between each other as in the formation 330, and the vehicles 310 and 314 having a same distance between each other as in the formation 330. In some embodiments, when the vehicle 316 is no longer in the leading mode, the vehicle 316 may not be communicating with the vehicles 318, 320, and the vehicles 318, 320 may switch to an independent mode, and may not be included in the formation 340.

In some embodiments, the vehicle 316 may decide which mode to switch to, for example, whether to switch to the following mode or to the independent mode, based on a detected road condition or an environment surrounding the vehicles. In some embodiments, the vehicle 316 may be switched to the independent mode or to the following mode when a road condition or a traffic condition prevents or impedes the vehicle 316 from directing or managing the fleet in the leading mode.

In some embodiments, the vehicle 316 may switch to the independent mode from the leading mode, as shown in FIG. 3C. Other vehicles, such as the vehicles 318 and 320, that previously followed commands or directions of the vehicle 316, may also switch to the independent mode in response to the vehicle 316 switching to the independent mode.

In some embodiments, the vehicle 316 may determine whether to switch to the following mode based on whether another leading vehicle is within a vicinity of the vehicle 316. If the vehicle 316 detects another leading vehicle, such as the vehicle 310, within a threshold range of the vehicle 316, the vehicle 316 may join a fleet in which the vehicle 310 is the leading vehicle. In some embodiments, the vehicle 316 may determine whether to switch to the following mode based on whether the vehicle 316 is able to function in the following mode. For example, the vehicle 316 may determine whether the vehicle 316 has functional equipment and is able to receive signals from another vehicle and follow commands or instructions from another vehicle. In some embodiments, the vehicle 316 may determine whether to join another fleet based on whether a road configuration or a road condition prevents the vehicle 316 from being part of the another fleet. For example, if the another fleet requires a side-by-side alignment and all lanes are occupied by other vehicles, the vehicle 316 cannot be part of the another fleet. In some embodiments, the vehicle 316 may determine whether to join the another fleet based on a planned route of the another fleet. For example, the vehicle 316 may determine whether a type of terrain or a road that is part of the route of the another fleet is suitable for travel by the vehicle 316. For instance, a type of terrain of the planned route may include off-road terrains, which may require a vehicle with an extended ground clearance, off-road tires and drive-train. If the vehicle 316 does not have these features, the vehicle 316 may determine not to join the another fleet. In another example, the vehicle 316 may determine whether to join the another fleet based on whether the another fleet requires or has a need for an additional vehicle to join the fleet. For example, if the another fleet has a purpose of coordinating deliveries and requires another vehicle to make deliveries in a specific area of a town, the vehicle 316 may join the another fleet.

Figure 4A:
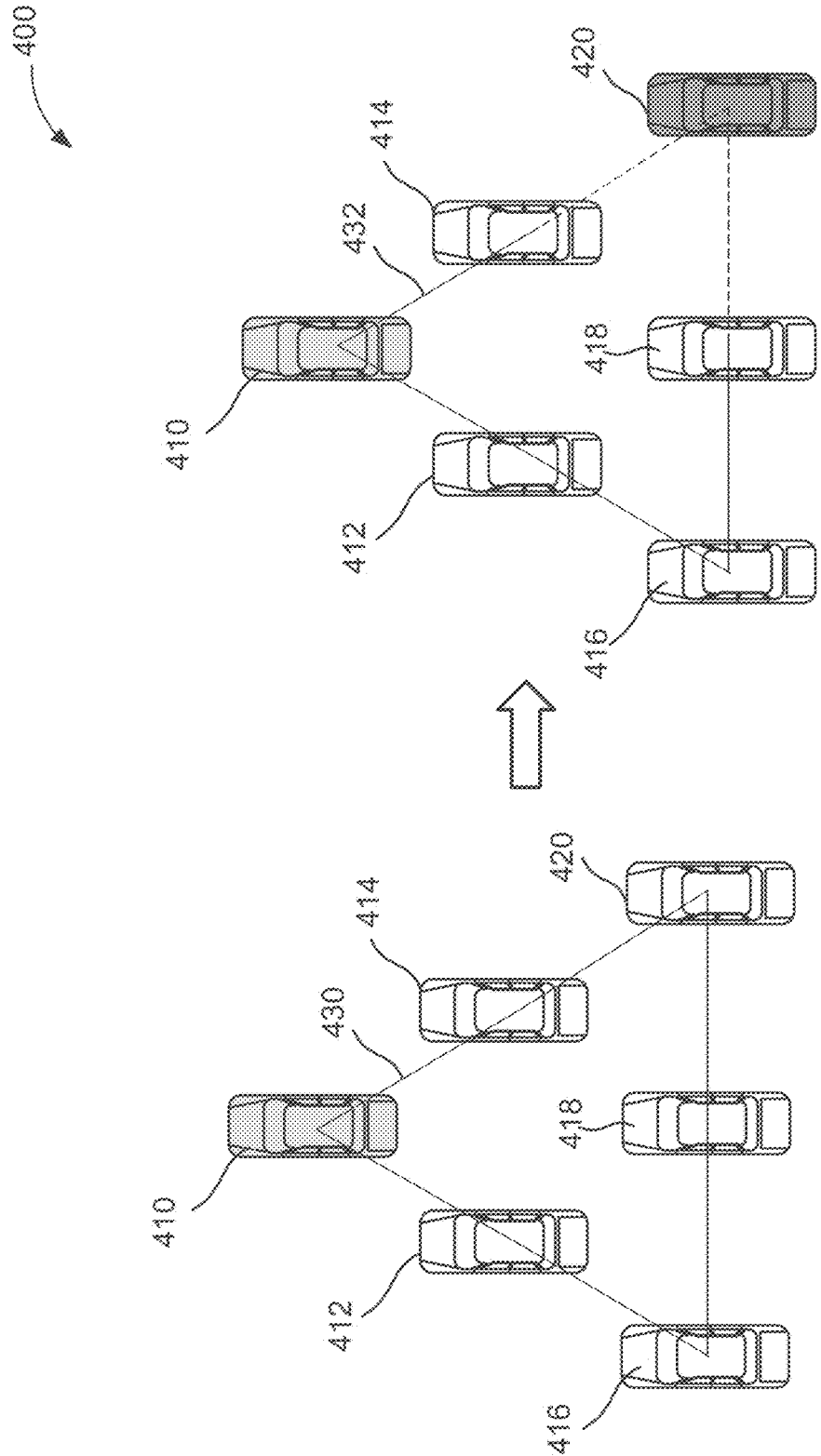
Figure 4B:
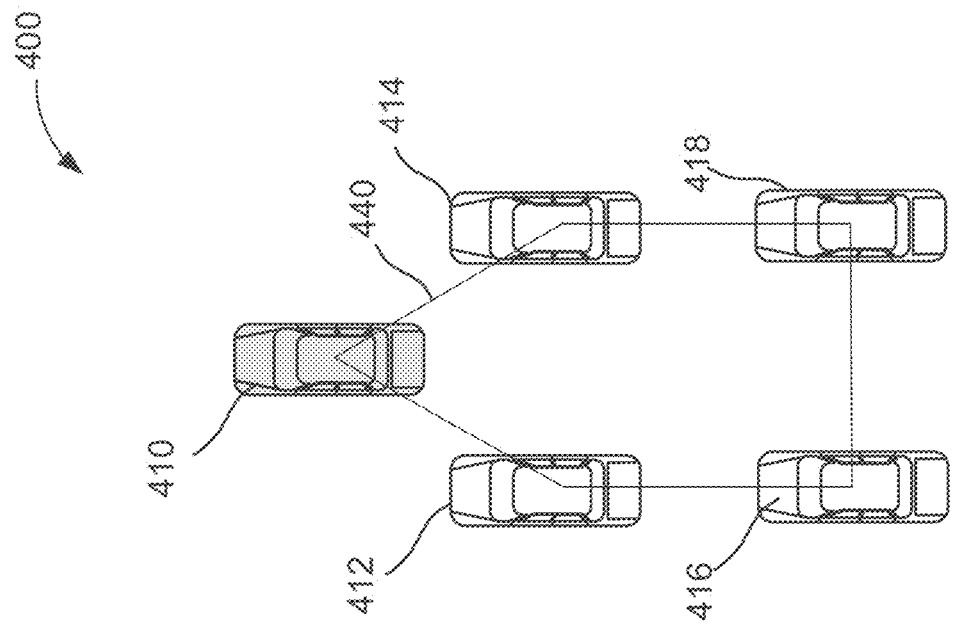
Figure 4B:
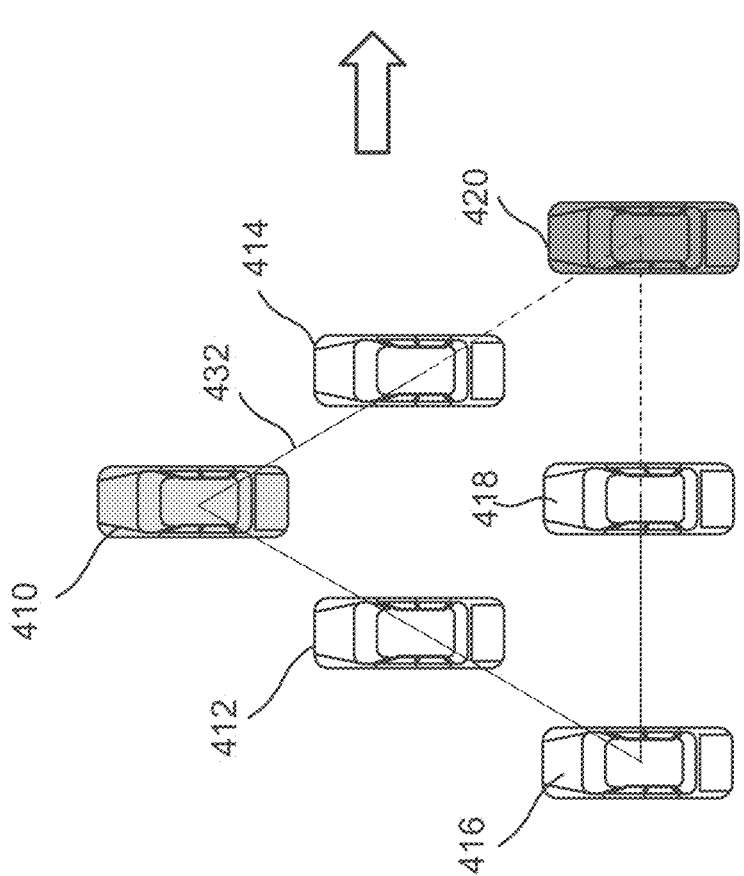
Figure 4C:
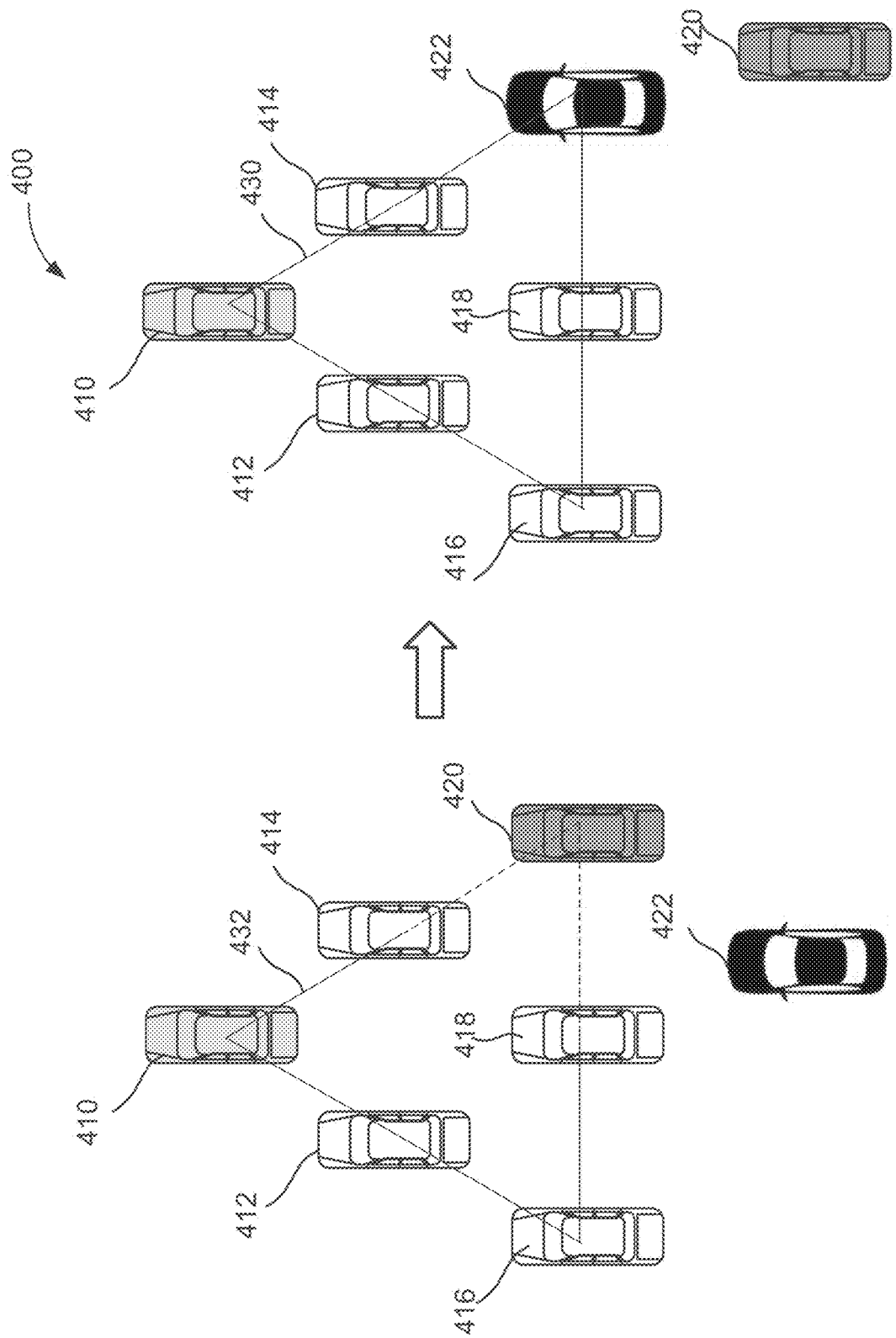

FIG. 4A, FIG. 4B, and FIG. 4C illustrate an example implementation 400 of a computing system such as the computing system 112 of vehicle 410, which may be implemented as the vehicle 102 of FIG. 1, in accordance with some embodiments. The particular details and aspects of FIG. 1 may be applicable to FIG. 4A, FIG. 4B, and FIG. 4C. In FIG. 4A, FIG. 4B, and FIG. 4C, any reference to a vehicle performing a determination or taking an action may be understood to mean that one or more processors of the vehicle or the controller 132 may perform the determination or take the action. Vehicles 410, 412, 414, 416, 418, and 420 may form a formation 430, in which the vehicle 410 may be a leading vehicle. In some embodiments, the vehicle 410, or the controller 132 of the vehicle 410, may determine that one of the following vehicles 420 becomes inoperational, thus rendering the previous formation 430 incomplete or inoperational, so that the previous formation is transformed into a formation 432. In some examples, as shown in FIG. 4B, the vehicle 410 may determine a new formation 440 based on a number and/or type of remaining vehicles in the formation and a road condition or configuration. For example, the new formation 440 may have the vehicles 412 and 416 having a same distance between each other as in the formation 430, and the vehicles 416 and 418 having a same distance between each other as in the formation 430.

In other examples, as shown in FIG. 4C, the vehicle 410 may determine to recruit another vehicle to preserve the previous formation 430, in response to determining that another vehicle is available and ready to join the fleet. In some examples, to resolve the incomplete or inoperational formation 432, the vehicle 410 may recruit another vehicle 422 to replace the vehicle 420 and provide same commands and directions to the another vehicle 421 as would have been provided to the vehicle 420. In some examples, the another vehicle 422 may travel at a same velocity as the other vehicles 412, 414, 416, 418, and the vehicle 410. In some examples, the vehicle 410 may recruit another ready and available vehicle closest to the incomplete formation 432.

Figure 5A:
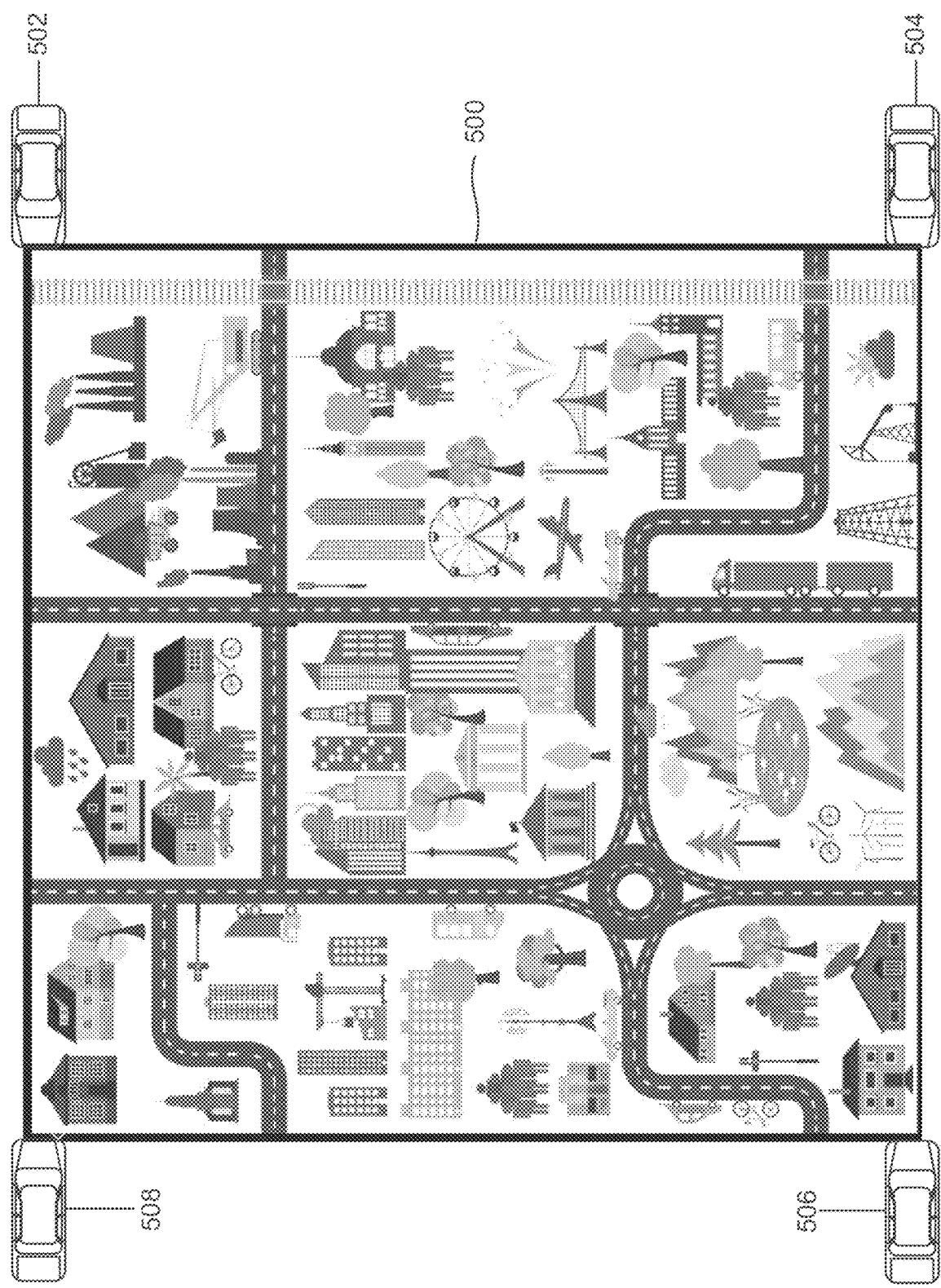
FIG. 5A and FIG. 5B illustrate an example implementation of a deployed fleet.
Figure 5B:
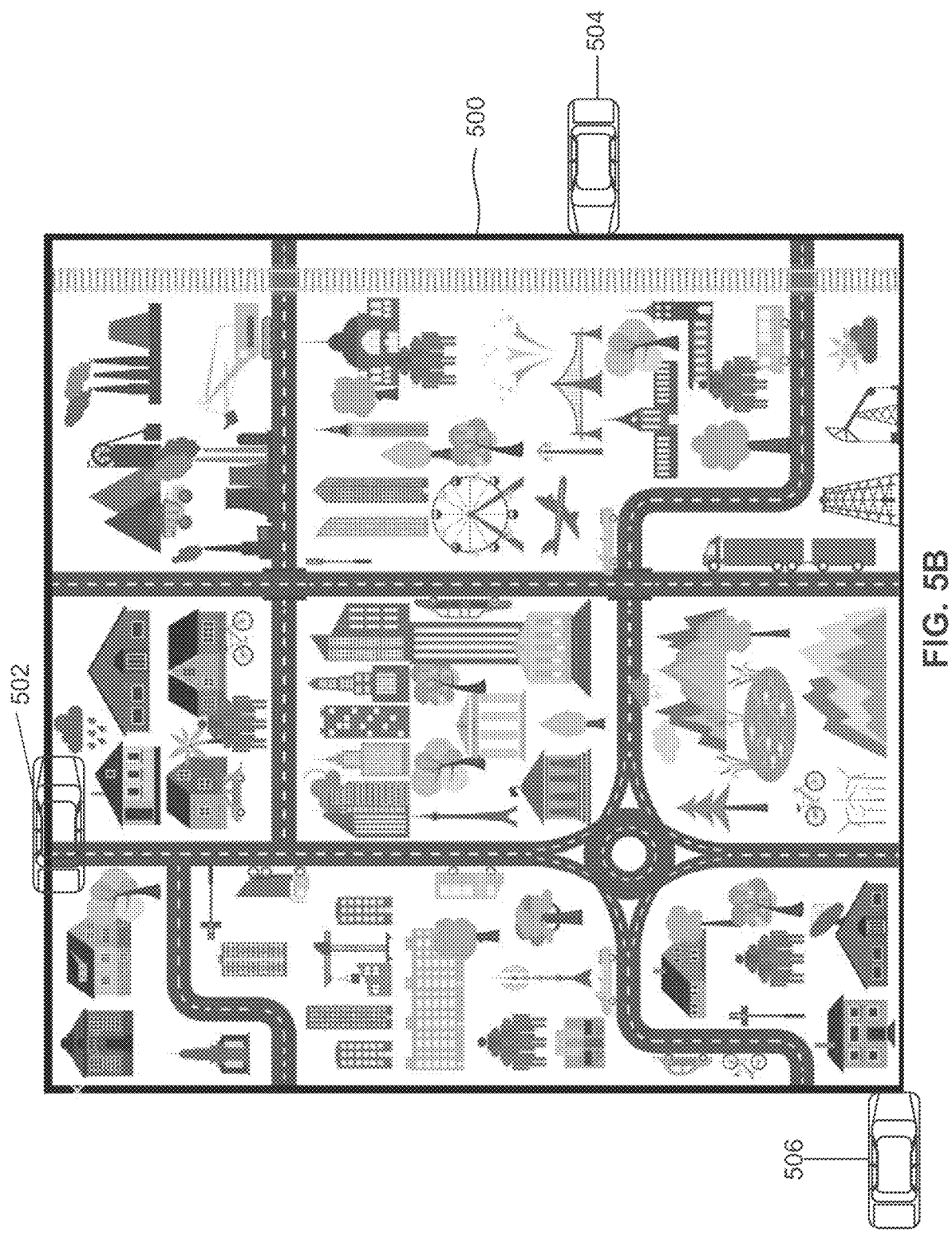

FIG. 5A and FIG. 5B illustrate an example implementation of a distributed fleet around a region or area 500. The particular details and aspects of FIG. 1 may be applicable to FIG. 5A and FIG. 5B. In FIG. 5A and FIG. 5B, any reference to a vehicle performing a determination or taking an action may be understood to mean that one or more processors of the vehicle or the controller 132 may perform the determination or take the action. In some embodiments, the region or area 500 may be a city or a town. Vehicles 502, 504, 506, and 508 may be part of a distributed fleet. In some embodiments, the vehicle 502 may be implemented as the vehicle 102 as part of the environment of FIG. 1. The computing system 112 of the vehicle 102, and/or the controller 132, may direct, coordinate, or control the operations of the distributed fleet, which may be used for transportation such as a taxi service or a delivery service such as a last mile carrier. The vehicle 502 may maintain the distributed fleet of vehicles 502, 504, 506, and 508 such that a distance among each of the vehicles 502, 504, 506, and 508 are equal. Even if one of the vehicles such as the vehicle 508 leaves on a transportation or delivery trip, for example, if the vehicle 508 has been called into service, the vehicle 502 may coordinate a rearrangement of the remaining vehicles 504, 506, and 502 such that the remaining vehicles have an equal distance among one another, as shown in FIG. 5B.

Figure 6:
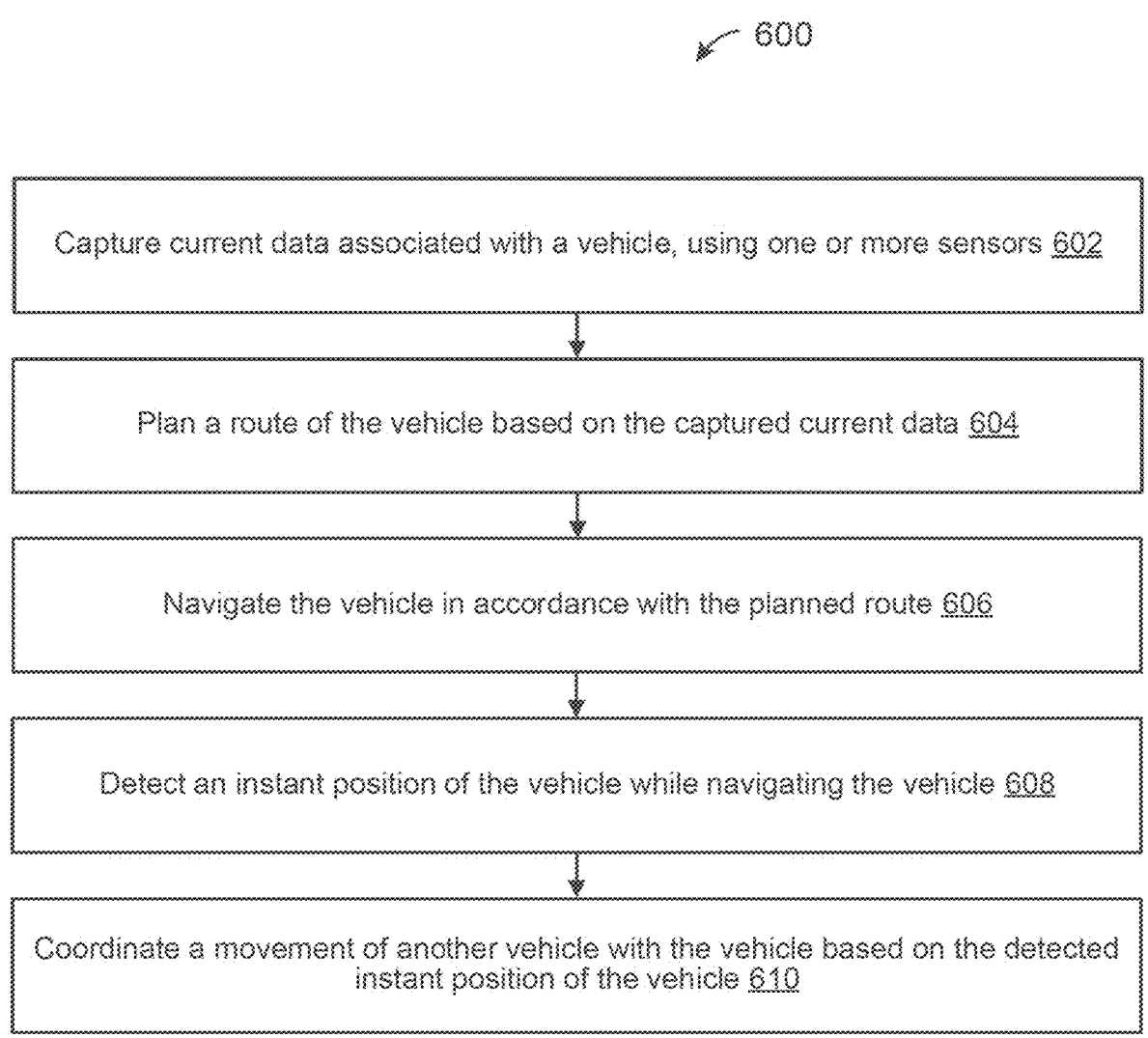
FIG. 6 depicts a flowchart of a method of vehicle fleet management, in accordance with some embodiments.

FIG. 6 illustrates a flowchart 600 of a method of vehicle fleet management, in accordance with some embodiments. In this and other flow flowcharts, the flowchart 600 illustrates by way of examples a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. is also applicable to FIG. 6. The example method 600 may be implemented in various computing systems or devices including one or more processors.

In step 602, one or more sensors may capture current data associated with the vehicle. In step 604, one or more processors may plan a route of the vehicle based on the captured current data. In step 606, the one or more processors may navigate the vehicle in accordance with the planned route. In step 608, the one or more processors may detect an instant position of the vehicle while navigating the vehicle. In step 610, the one or more processors may coordinate a movement of another vehicle with the vehicle based on the detected instant position of the vehicle.

Figure 7:
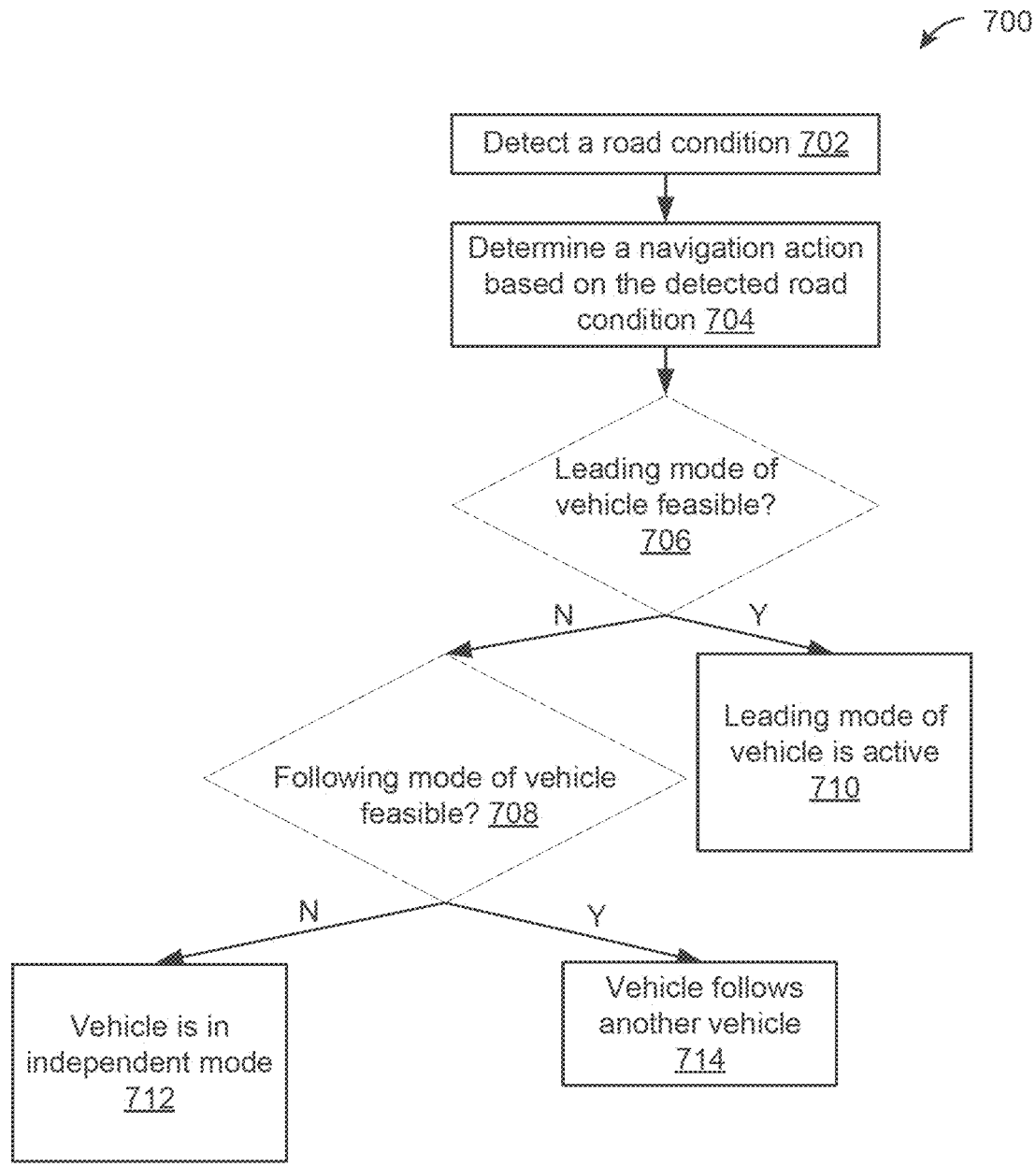
FIG. 7 depicts a flowchart of a method of vehicle fleet management, in accordance with some embodiments.

FIG. 7 illustrates a flowchart of a method of vehicle fleet management, in accordance with some embodiment. The vehicle may be part of a fleet in FIG. 7 and may be implemented as the vehicle 102. In step 702, using one or more sensors, the vehicle may detect a road condition. In step 704, the vehicle may determine a navigation action based on the detected condition. In decision 706, the vehicle may determine whether a leading mode of the vehicle is feasible, for example, based on vehicle conditions and/or road conditions. A vehicle in the leading mode may coordinate, direct, and/or command actions of other vehicles of the fleet. If the vehicle determines the leading mode is not feasible in decision 706, the vehicle proceeds to decision 708 and may determine whether a following mode of the vehicle is feasible. The following mode comprises the vehicle accepting commands or instructions from other vehicles. In response to the vehicle determining that the following mode is not feasible, then the vehicle is determined to be in an independent mode in step 712. If the vehicle determines the following mode is feasible, the vehicle may follow another vehicle in step 714. Back to decision 706, if the vehicle determines that the vehicle 102 can feasibly be in the leading mode, the vehicle selects or activates the leading mode.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
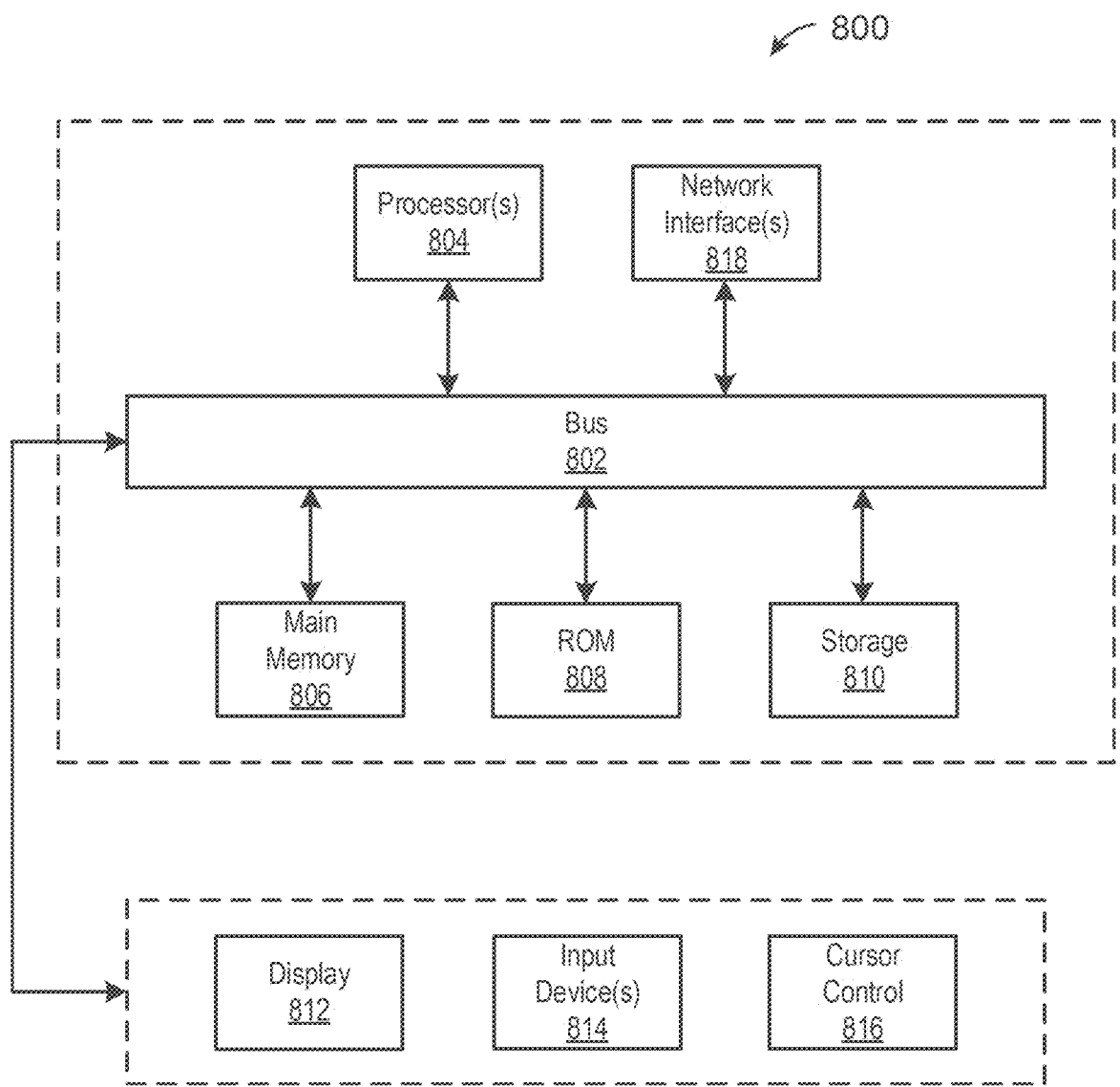
FIG. 8 depicts a diagram of an example computer system for implementing the features disclosed herein.

FIG. 8 is a block diagram that illustrates a computer system 800 upon which any of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to output device(s) 812, such as a cathode ray tube (CRT) or LCD display (or touch screen), for displaying information to a computer user. Input device(s) 814, including alphanumeric and other keys, are coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which may include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system in a vehicle comprising:
   one or more sensors configured to capture data;
   one or more processors; and
   a memory storing instructions that, when executed by the one or more processors, cause the system to perform:
      capturing, using the one or more sensors, current data associated with the vehicle;
      planning a route of the vehicle based on the captured current data;
      navigating the vehicle in accordance with the planned route;

detecting an instant position of the vehicle while navigating the vehicle;

coordinating a movement of a second vehicle and a third vehicle in a fleet with the vehicle based on the detected instant position of the vehicle;

determining, based on the captured current data, whether the second vehicle becomes incompatible with a terrain of a planned route of the fleet; and in response to determining that the second vehicle becomes incompatible with a terrain of a planned route of the fleet based on an extent of a ground clearance, a type of tire, and drive-train of the second vehicle, wherein the terrain of the planned route comprises an off-road terrain:

selecting a backup vehicle to join the fleet to replace the second vehicle, wherein the backup vehicle comprises features suitable for the planned route;

coordinating a movement of the backup vehicle with the vehicle based on the detected instant position of the vehicle;

determining a density of accidents; and determining a change in a formation of the fleet based on the density of accidents, wherein the change comprises an alteration in relative spacing among the vehicle, the second vehicle, and the third vehicle.

2. The system of claim 1, wherein the coordinating a movement of the second vehicle in the fleet comprises directing the second vehicle to maintain a same distance from the vehicle and maintain a same velocity as a velocity of the vehicle.

3. The system of claim 1, wherein the coordinating a movement of the second vehicle in the fleet comprises:

determining a formation of the fleet comprising the vehicle and the second vehicle; and commanding the second vehicle to maintain a position relative to the vehicle based on the determined formation of the fleet.

4. The system of claim 3, wherein the capturing the current data comprises capturing current data of a road condition, and wherein the coordinating a movement of the second vehicle in the fleet comprises:

in response to detecting that the road condition prevents a continued deployment of the determined formation, controlling the fleet to adjust the formation to a new formation compatible with the road condition.

5. The system of claim 4, wherein the road condition comprises a distribution of traffic, or a change in the distribution of traffic.

6. The system of claim 1, wherein the instructions further cause the system to perform:

determining, based on a road condition or a condition of the vehicle, whether the road condition or the condition of the vehicle prevents the vehicle from continuing to coordinate the movement of the second vehicle; and in response to determining that the road condition or the condition of the vehicle prevents the vehicle from continuing to coordinate the movement of the second vehicle, navigating the vehicle based on a signal or command from a third vehicle that coordinates another fleet of vehicles.

7. The system of claim 1, wherein the instructions further cause the system to perform:

determining, based on a road condition or a condition of the vehicle, whether the road condition or the condition of the vehicle prevents the vehicle from continuing to coordinate the movement of the second vehicle; and in response to determining that the road condition or the condition of the vehicle prevents the vehicle from continuing to coordinate the movement of the second vehicle, navigating the vehicle based on a signal or command from the second vehicle, the second vehicle coordinating the movement of the vehicle.

8. The system of claim 1, wherein the coordinating a movement of the second vehicle in the fleet comprises commanding the second vehicle to conform to a formation of the fleet; and the instructions further cause the system to perform:

detecting a signal from a third vehicle that the third vehicle intends to join the fleet;

determining whether to permit the third vehicle to join the fleet based on a road or traffic condition; and in response to determining to permit the third vehicle to join the fleet, changing the formation to a new formation to accommodate the third vehicle.

9. The system of claim 8, wherein the changing the formation to a new formation comprises maintaining a distance between the vehicle and the second vehicle in the new formation to be equal to a distance between the vehicle and the second vehicle in the formation.

10. The system of claim 1, wherein the features comprise type of tires, drive-train and ground clearance.

11. The system of claim 1, wherein the instructions further cause the system to perform:

determining, based on the captured current data, a region where the fleet comprising the vehicle and the second vehicle are en route to; and deploying the second vehicle to a different location in the region from a location of the vehicle, wherein the second vehicle maintains a position relative to the vehicle.

12. The system of claim 1, wherein the selecting of a backup vehicle to join the fleet to replace the another vehicle is based on additional vehicles under a command of the backup vehicle that were previously outside of the fleet;

and the instructions, when executed by the one or more processors, further cause the system to perform:

changing a formation of the fleet to incorporate the vehicle, the backup vehicle, and the additional vehicles; and coordinating a movement of the additional vehicles with the backup vehicle and the vehicle based on the detected instant position of the vehicle.

13. A method implemented by a computing system including one or more processors and storage media storing machine-readable instructions, wherein the method is performed using the one or more processors, the method comprising:

capturing, using one or more sensors, current data associated with the vehicle;

planning a route of the vehicle based on the captured current data;

navigating the vehicle in accordance with the planned route;

detecting an instant position of the vehicle while navigating the vehicle;

coordinating a movement of a second vehicle and a third vehicle in a fleet with the vehicle based on the detected instant position of the vehicle;

determining, based on the captured current data, whether the second vehicle becomes incompatible with a terrain of a planned route of the fleet; and in response to determining that the second vehicle becomes incompatible with a terrain of a planned route of the fleet based on an extent of a ground clearance, a type of tire, and drive-train of the second vehicle, wherein the terrain of the planned route comprises an off-road terrain:
  selecting a backup vehicle to join the fleet to replace the second vehicle, wherein the backup vehicle comprises features suitable for the planned route;
  coordinating a movement of the backup vehicle with the vehicle based on the detected instant position of the vehicle;
  determining a density of accidents; and
  determining a change in a formation of the fleet based on the density of accidents, wherein the change comprises an alteration in relative spacing among the vehicle, the second vehicle, and the third vehicle.

14. The method of claim 13, wherein the coordinating a movement of the second vehicle in the fleet comprises directing the second vehicle to maintain a same distance from the vehicle and maintain a same velocity as a velocity of the vehicle.

15. The method of claim 13, wherein the coordinating a movement of the second vehicle in the fleet comprises:
  determining a formation of the fleet comprising the vehicle and the second vehicle; and
  commanding the second vehicle to maintain a position relative to the vehicle based on the determined formation of the fleet.

16. The method of claim 15, wherein the capturing the current data comprises capturing current data of a road condition, and wherein the coordinating a movement of the second vehicle in the fleet comprises:
  in response to detecting that the road condition prevents a continued deployment of the determined formation, controlling the fleet to adjust the formation to a new formation compatible with the road condition.

17. The method of claim 13, further comprising:
  determining, based on a road condition or a condition of the vehicle, whether the road condition or the condition of the vehicle prevents the vehicle from continuing to coordinate the movement of the second vehicle; and
  in response to determining that the road condition or the condition of the vehicle prevents the vehicle from continuing to coordinate the movement of the second vehicle, navigating the vehicle based on a signal or command from a third vehicle that coordinates another fleet of vehicles.

18. The method of claim 13, further comprising:
  determining, based on a road condition or a condition of the vehicle, whether the road condition or the condition of the vehicle prevents the vehicle from continuing to coordinate the movement of the second vehicle; and
  in response to determining that the road condition or the condition of the vehicle prevents the vehicle from continuing to coordinate the movement of the second vehicle, navigating the vehicle based on a signal or command from the second vehicle, the second vehicle coordinating the movement of the vehicle.

19. The method of claim 13, wherein the coordinating a movement of the second vehicle in the fleet comprises commanding the second vehicle to conform to a formation of the fleet; and the method further comprises:
  detecting a signal from a third vehicle that the third vehicle intends to join the fleet;
  determining whether to permit the third vehicle to join the fleet based on a road or traffic condition; and
  in response to determining to permit the third vehicle to join the fleet, changing the formation to a new formation to accommodate the third vehicle.

20. A non-transitory computer medium comprising instructions that, when executed, cause one or more processors to perform:
  capturing, using one or more sensors, current data associated with the vehicle;
  planning a route of the vehicle based on the captured current data;
  navigating the vehicle in accordance with the planned route;
  detecting an instant position of the vehicle while navigating the vehicle;
  coordinating a movement of a second vehicle and a third vehicle in a fleet with the vehicle based on the detected instant position of the vehicle;
  determining, based on the captured current data, whether the second vehicle becomes incompatible with a terrain of a planned route of the fleet; and
  in response to determining that the second vehicle becomes incompatible with a terrain of a planned route of the fleet based on an extent of a ground clearance, a type of tire, and drive-train of the second vehicle, wherein the terrain of the planned route comprises an off-road terrain:
    selecting a backup vehicle to join the fleet to replace the second vehicle, wherein the backup vehicle comprises features suitable for the planned route;
    coordinating a movement of the backup vehicle with the vehicle based on the detected instant position of the vehicle;
    determining a density of accidents; and
    determining a change in a formation of the fleet based on the density of accidents, wherein the change comprises an alteration in relative spacing among the vehicle, the second vehicle, and the third vehicle.

* * * * *